US012678898B2

(12) United States Patent
Hou et al.

(10) Patent No.: US 12,678,898 B2
(45) Date of Patent: Jul. 14, 2026

(54) RAIL APPARATUS, LASER APPARATUS, AND LASER MACHINING DEVICE

(71) Applicant: Makeblock Co., Ltd., Shenzhen (CN)

(72) Inventors: Guangliang Hou, Shenzhen (CN);
Jianjun Wang, Shenzhen (CN);
Wenhua Wang, Shenzhen (CN);
Dongdong Shi, Shenzhen (CN); Kaiyao Chen, Shenzhen (CN); Juan Ma,
Shenzhen (CN); Lijiao Xin, Shenzhen
(CN)

(73) Assignee: MAKEBLOCK CO., LTD., Shenzhen
(CN)

(*) Notice: Subject to any disclaimer, the term of this
patent is extended or adjusted under 35
U.S.C. 154(b) by 713 days.

(21) Appl. No.: 18/184,988

(22) Filed: Mar. 16, 2023

(65) Prior Publication Data

US 2023/0226649 A1    Jul. 20, 2023

Related U.S. Application Data

(63) Continuation of application No.
PCT/CN2022/102380, filed on Jun. 29, 2022.

(30) Foreign Application Priority Data

Jun. 30, 2021    (CN) .......................... 202110745679.7

(51) Int. Cl.
B23K 37/02       (2006.01)
B23K 26/08       (2014.01)
B23K 26/36       (2014.01)
(52) U.S. Cl.
CPC ...... B23K 37/0211 (2013.01); B23K 26/0869
(2013.01); B23K 26/36 (2013.01); **B23K
37/0247** (2013.01)

(58) Field of Classification Search
CPC ............ B23K 37/0211; B23K 26/0869; B23K
26/36; B23K 37/0247; B23K 26/0876;
(Continued)

(56) References Cited

U.S. PATENT DOCUMENTS

2003/0118256 A1    6/2003  Ishihara
2008/0122196 A1*   5/2008  Kircher ..................... B60R 3/02
280/166

FOREIGN PATENT DOCUMENTS

CN        201086174        7/2008
CN        204081861 U      1/2015
(Continued)

OTHER PUBLICATIONS

The first office action issued in corresponding CN application No.
202110745679.7 dated Jan. 5, 2023.
(Continued)

*Primary Examiner* — Robert G Bachner
(74) *Attorney, Agent, or Firm* — HAUPTMAN HAM,
LLP

(57)                ABSTRACT

A rail apparatus, a laser apparatus, and a laser machining
device are provided in the present disclosure. The rail
apparatus includes a rail frame assembly and a mounting
assembly. The rail frame assembly includes a rail frame and
a guide shaft fixed to the rail frame. The mounting assembly
includes a mounting base and a pulley. The pulley defines a
sliding groove. The sliding groove is slidably connected
with the guide shaft. The laser apparatus includes a base, a
laser, and a focusing member. The laser is disposed on the
base and is configured to emit a laser light. The focusing
member is movably disposed on the base and has a focusing
end. The laser apparatus is operable in a retracting state and
an extending state. The laser machining device includes the
rail apparatus and the laser apparatus.

22 Claims, 12 Drawing Sheets

(58) Field of Classification Search
CPC ...... B23K 26/38; B23K 26/362; B23K 26/70;
B23K 26/702
See application file for complete search history.

(56) References Cited

FOREIGN PATENT DOCUMENTS

| CN | 204771139 U | 11/2015 |
| CN | 105216307 A | 1/2016 |
| CN | 106915284 A | 7/2017 |
| CN | 206732360 U | 12/2017 |
| CN | 107605342 A | 1/2018 |
| CN | 206900002   | 1/2018 |
| CN | 207539185 U | 6/2018 |
| CN | 108905821 A | 11/2018 |
| CN | 208226297 U | 12/2018 |
| CN | 109465539 A | 3/2019 |
| CN | 109638619 A | 4/2019 |
| CN | 209551128   | 10/2019 |
| CN | 210147482 U | 3/2020 |
| CN | 210188806 U | 3/2020 |
| CN | 210462863 U | 5/2020 |
| CN | 210899380 U | 6/2020 |
| CN | 111994585 A | 11/2020 |
| CN | 211908300 U | 11/2020 |
| CN | 211919826 U | 11/2020 |
| CN | 212286312 U | 1/2021 |
| CN | 215787488 U | 2/2022 |
| CN | 216398406 U | 4/2022 |
| JP | 2002137084 A | 5/2002 |

OTHER PUBLICATIONS

WIPO, International Search Report and Written Opinion for International Application No. PCT/CN2022/102380, Sep. 5, 2022.

The extended European search report issued in corresponding European application No. 22832112.1 dated Oct. 15, 2024.

The second office action issued in corresponding CN application No. 202110745679.7 dated Jun. 3, 2023.

The third office action issued in corresponding CN application No. 202110745679.7 dated Sep. 28, 2023.

* cited by examiner

100

303

90

90

RAIL APPARATUS, LASER APPARATUS, AND LASER MACHINING DEVICE

CROSS-REFERENCE TO RELATED APPLICATION(S)

This application is a continuation of International Application No. PCT/CN2022/102380, filed Jun. 29, 2022, which claims priority to Chinese Patent Application No. 202110745679.7 filed Jun. 30, 2021, the entire disclosure of which are incorporated herein by reference.

TECHNICAL FIELD

This disclosure relates to the field of laser engraving and cutting technology, and in particular to a rail apparatus, a laser apparatus, and a laser machining device.

BACKGROUND

Laser machining devices use laser lights as machining media to machine. Since a laser machining device is not directly in contact with a workpiece, the laser machining device is not affected by mechanical movement, and a surface of the workpiece is not easy to deform.

In the laser machining device, a laser apparatus moves along a rail apparatus to change a machining position. However, movement accuracy of an existing laser apparatus when moving along the rail apparatus is not high, which affects machining accuracy.

When the laser apparatus of the laser machining device is in use, the laser apparatus needs to determine a focus of a laser light, which is a fixed distance size. At present, a focusing column can be placed between the laser apparatus and an object to-be-machined, and then the focusing column is taken away after a height position of the laser device is fixed. However, the focusing column is easy to lose, which affects the use.

SUMMARY

In a first aspect, a rail apparatus is provided in the present disclosure. The rail apparatus is applied to a laser machining device and includes a rail frame assembly and a mounting assembly. The rail frame assembly includes a rail frame and a guide shaft fixed to the rail frame. The mounting assembly includes a mounting base and a pulley. The pulley defines a sliding groove. The sliding groove is slidably connected with the guide shaft.

In a second aspect, a laser apparatus is provided in the present disclosure. The laser apparatus includes a base, a laser, and a focusing member. The laser is disposed on the base and is configured to emit a laser light. The base has a first end and a second end opposite to the first end. The focusing member is movably disposed on the base and has a focusing end. The laser apparatus is operable in a retracting state and an extending state. When the focusing end is stacked on the base, the laser apparatus is in the retracting state. When the focusing end extends beyond the second end of the base to abut against a workpiece, the laser apparatus is in the extending state.

In a third aspect, a laser machining device is provided in the present disclosure. The laser machining device includes a rail apparatus and a laser apparatus. The rail apparatus includes a rail frame assembly and a mounting assembly. The rail frame assembly includes a rail frame and a guide shaft fixed to the rail frame. The mounting assembly includes a mounting base and a pulley. The pulley defines a sliding groove. The sliding groove is slidably connected with the guide shaft. The laser apparatus is connected with the mounting base, and configured to emit a laser light to perform laser machining on a workpiece.

BRIEF DESCRIPTION OF THE DRAWINGS

In order to describe technical solutions in implementations of the present disclosure or the related art more clearly, the following briefly introduces the accompanying drawings required for describing implementations or the related art. Apparently, the accompanying drawings in the following description only illustrate some implementations of the present disclosure. Those of ordinary skill in the art may also obtain other drawings based on these accompanying drawings without creative efforts.

DETAILED DESCRIPTION

Figure 1:
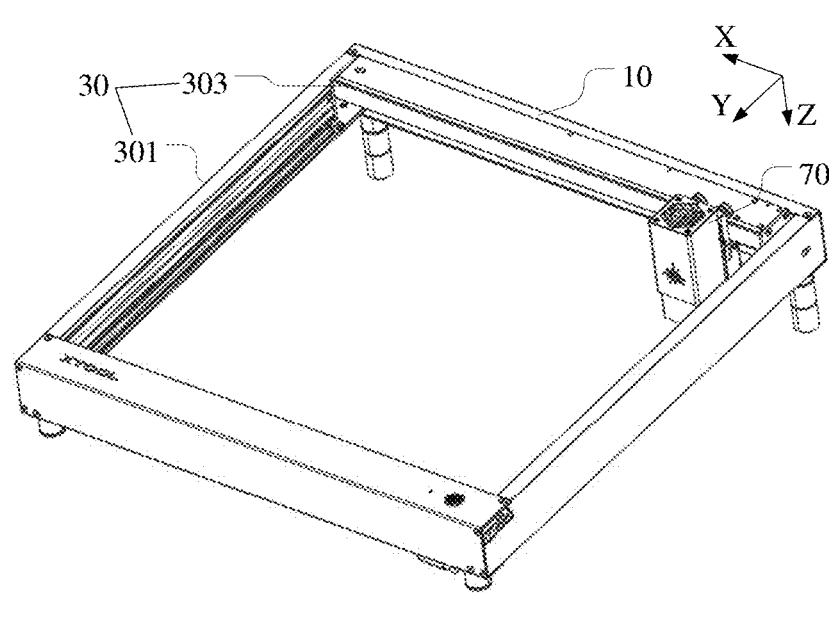
FIG. 1 is a schematic perspective assembly view of a laser machining device provided in an implementation of the present disclosure.

The following will describe technical solutions in implementations of the present disclosure clearly and completely with reference to the accompanying drawings in implementations of the present disclosure. Apparently, implementations described herein are merely some implementations, rather than all implementations, of the present disclosure. Based on implementations of the present disclosure, all other implementations obtained by those of ordinary skill in the art without creative effort shall fall within the protection scope of the present disclosure.

In order to solve the above problem, a rail apparatus and a laser machining device are provided in the present disclosure, and can improve machining accuracy.

In a first aspect, a rail apparatus is provided in the present disclosure. The rail apparatus is applied to a laser machining device and includes a rail frame assembly and a mounting assembly. The rail frame assembly includes a rail frame and a guide shaft fixed to the rail frame. The mounting assembly includes a mounting base and a pulley. The pulley defines a sliding groove. The sliding groove is slidably connected with the guide shaft.

In some implementations, the pulley is rotatably mounted on the mounting base, and configured to roll along the guide shaft.

In some implementations, the guide shaft includes a first guide shaft and a second guide shaft. The pulley includes a first pulley and a second pulley. The first pulley is mounted on the mounting base and slidably connected with the first guide shaft. The first pulley is disposed between the first guide shaft and the second guide shaft. The second pulley is mounted on the mounting base and slidably connected with the second guide shaft. The second pulley is disposed between the first guide shaft and the second guide shaft.

In some implementations, the rail frame defines a groove. At least part of the first guide shaft is accommodated in the groove. At least part of the second guide shaft is accommodated in the groove. The first pulley is accommodated in the groove. The second pulley is accommodated in the groove. The first guide shaft is disposed opposite to the second guide shaft.

In some implementations, the rail frame includes a first connecting portion and a second connecting portion fixedly connected with the first connecting portion. The first connecting portion and the second connecting portion cooperatively define the groove. The first connecting portion defines a first accommodating groove communicating with the groove. The first guide shaft is fixedly accommodated in the first accommodating groove. The second connecting portion defines a second accommodating groove communicating with the groove. The second guide shaft is fixedly accommodated in the second accommodating groove.

In some implementations, the guide shaft includes a first guide shaft and a second guide shaft. The pulley includes a first pulley and a second pulley. The first pulley is mounted on the mounting base and slidably connected with the first guide shaft. The first guide shaft is disposed between the first pulley and the second pulley. The second pulley is mounted on the mounting base and slidably connected with the second guide shaft. The second guide shaft is disposed between the first pulley and the second pulley.

In some implementations, the rail frame includes a first connecting portion, a second connecting portion, and a third connecting portion that are fixedly connected with one another. The third connecting portion is connected between the first connecting portion and the second connecting portion. The first connecting portion, the second connecting portion, and the third connecting portion cooperatively define a groove. The first guide shaft is fixed to an end of the first connecting portion connected with the third connecting portion. The second guide shaft is fixedly accommodated in an end of the first connecting portion away from the third connecting portion. The first connecting portion is disposed between the first pulley and the second pulley.

In some implementations, the rail frame includes a first connecting portion and a second connecting portion fixedly connected with the first connecting portion. The first connecting portion defines a groove on a surface of the first connecting portion away from the second connecting portion. The second connecting portion defines a guide groove. The guide groove has an opening direction different from the groove. The first guide shaft is fixed to an inner wall of the guide groove. The second guide shaft is fixed to an end surface of the first connecting portion away from the second connecting portion. The first connecting portion is disposed between the first pulley and the second pulley. The first pulley is accommodated in the guide groove.

In some implementations, the mounting base includes a mounting plate and a connecting member fixed to the mounting plate. The pulley is mounted on the mounting plate; and the rail apparatus further includes a driving member and a transmission assembly. The transmission assembly includes a driving gear, a driven gear, and a synchronous belt. The driving gear is connected with the driving member. The driven gear is rotatably disposed on the rail frame. The synchronous belt is wound around the driving gear and the driven gear. The connecting member is connected with the synchronous belt. Rotation of the driving gear is configured to drive rotation of the synchronous belt to drive linear movement of the mounting assembly along the guide shaft.

In a second aspect, a laser apparatus is provided in the present disclosure. The laser apparatus includes a base, a laser, and a focusing member. The laser is disposed on the base and is configured to emit a laser light. The base has a first end and a second end opposite to the first end. The focusing member is movably disposed on the base and has a focusing end. The laser apparatus is operable in a retracting state and an extending state. When the focusing end is stacked on the base, the laser apparatus is in the retracting state. When the focusing end extends beyond the second end of the base to abut against a workpiece, the laser apparatus is in the extending state.

In some implementations, the focusing member further includes a connecting end opposite to the focusing end. The connecting end is rotatably disposed at the second end of the base. The focusing member is configured to rotate by taking a joint of the connecting end and the base as a rotating pivot point.

In some implementations, the base defines a mounting groove for the focusing member in an outer wall of the base. The mounting groove for the focusing member penetrates through an end surface of the second end of the base. The connecting end is rotatably connected with an inner wall of the mounting groove for the focusing member. When the focusing end is accommodated in the mounting groove for the focusing member, the laser apparatus is in the retracting state.

In some implementations, the focusing member further includes a plate body and a protrusion protruding from an outer wall of the plate body. The plate body includes the connecting end and the focusing end opposite to the connecting end. The protrusion exposes beyond the mounting groove for the focusing member.

In some implementations, the laser apparatus is connected with a rail apparatus. The rail apparatus includes a mounting plate. The mounting plate is configured to be movably connected with the base to adjust a relative position of the mounting plate and the base.

In some implementations, the base is provided with a first guide portion on an outer wall of the base. The mounting plate is provided with a second guide portion. The first guide portion is slidably connected with the second guide portion. One of the first guide portion and the second guide portion is a guide rail. Another of the first guide portion and the second guide portion is a guide-rail groove. The guide rail is slidably accommodated in the guide-rail groove.

In some implementations, the first guide portion is the guide rail. The second guide portion is the guide-rail groove. The mounting plate defines an adjustment hole in an outer wall of the mounting plate. The adjustment hole communicates with the guide-rail groove. The laser apparatus further includes a locking member. The locking member passes through the adjustment hole and abuts against the guide rail. The locking member is configured to limit the relative position of the mounting plate and the base.

In some implementations, the second guide portion is the guide rail. The first guide portion is the guide-rail groove. The base defines an adjustment hole in an outer wall of the base. The adjustment hole communicates with the guide-rail groove. The laser apparatus further includes a locking member. The locking member passes through the adjustment hole and abuts against the guide rail. The locking member is configured to limit the relative position of the mounting plate and the base.

In some implementations, the locking member is a threaded member, and the adjustment hole is a threaded hole.

In a third aspect, a laser machining device is provided in the present disclosure. The laser machining device includes a rail apparatus and a laser apparatus. The rail apparatus includes a rail frame assembly and a mounting assembly. The rail frame assembly includes a rail frame and a guide shaft fixed to the rail frame. The mounting assembly includes a mounting base and a pulley. The pulley defines a sliding groove. The sliding groove is slidably connected with the guide shaft. The laser apparatus is connected with the mounting base, and configured to emit a laser light to perform laser machining on a workpiece.

In some implementations, the laser apparatus includes a base, a laser, and a focusing member. The laser is disposed on the base and is configured to emit a laser light. The base has a first end and a second end opposite to the first end. The focusing member is movably disposed on the base and has a focusing end. The laser apparatus is operable in a retracting state and an extending state. When the focusing end is stacked on the base, the laser apparatus is in the retracting state. When the focusing end extends beyond the second end of the base to abut against the workpiece, the laser apparatus is in the extending state.

In some implementations, the focusing member further includes a connecting end opposite to the focusing end. The connecting end is rotatably disposed at the second end of the base. The focusing member is configured to rotate by taking a joint of the connecting end and the base as a rotating pivot point. The base defines a mounting groove for the focusing member in an outer wall of the base. The mounting groove for the focusing member penetrates through an end surface of the second end of the base. The connecting end is rotatably connected with an inner wall of the mounting groove for the focusing member. When the focusing end is accommodated in the mounting groove for the focusing member. The laser apparatus is in the retracting state. The focusing member further includes a plate body and a protrusion protruding from an outer wall of the plate body. The plate body includes the connecting end and the focusing end opposite to the connecting end. The protrusion exposes beyond the mounting groove for the focusing member.

In some implementations, the laser machining device further includes a roller apparatus. The roller apparatus includes a stage, a limiting member, a first roller, and a second roller. The limiting member is fixed to the stage. The limiting member defines an adjustment groove. The first roller rotatably passes through the adjustment groove. The second roller rotatably passes through the limiting member. The first roller and the second roller are arranged in a direction perpendicular to an axial direction of the first roller. The adjustment groove extends in the direction perpendicular to the axial direction of the first roller. The first roller is configured to move in the direction perpendicular to the axial direction of the first roller to adjust a distance between the first roller and the second roller.

For the laser machining device provided in the present disclosure, the pulley is slidably connected with the guide shaft, the guide shaft guides the movement of the mounting assembly relative to the rail frame, such that smoothness and accuracy of movement of the mounting assembly relative to the rail frame are improved, and machining accuracy of the laser machining device is further improved. In addition, the laser apparatus is provided with the focusing member, and when the focusing member is needed for focusing, the focusing end of the focusing member is manually pulled out to expose beyond the second end of the base, and the focusing end abuts against the workpiece, such that a distance between the second end of the base and the workpiece is obtained, and a proper height position for machining of the laser apparatus is further obtained. When the focusing member is not in use, the focusing end is retracted, such that the focusing end does not extend beyond the second end of the base, and machining of the laser apparatus on the workpiece is not affected. Since the focusing member is not separated from the base, the focusing member is not easy to lose, which improves the convenience of use.

Figure 2:
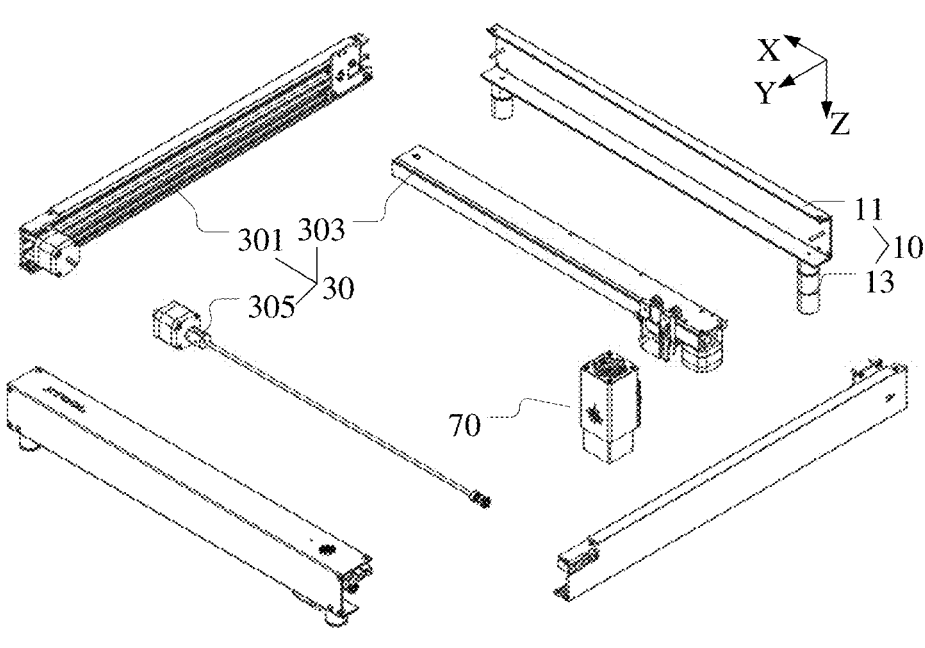
FIG. 2 is an exploded schematic perspective view of a laser machining device.

Reference can be made to FIG. 1 and FIG. 2. A laser machining device 100 is provided in an implementation of the present disclosure, and is configured to perform laser machining on a workpiece (not illustrated in the figure). In this implementation, the laser machining device 100 is a household laser engraving and cutting device. It can be understood that in the present disclosure, the laser machining device 100 is not limited to a laser engraving device, and may be other laser machining devices.

The laser machining device 100 includes a support apparatus 10, a rail apparatus 30, and a laser apparatus 70. The support apparatus 10 is configured to support the rail apparatus 30 and the laser apparatus 70. The rail apparatus 30 includes a first rail apparatus 301 and a second rail apparatus 303. The first rail apparatus 301 is fixed to the support apparatus 10. The second rail apparatus 303 is movably disposed on the first rail apparatus 301. The second rail apparatus 303 is able to move linearly on the first rail apparatus 301 in a first direction (i.e., direction Y illustrated in FIG. 1 and FIG. 2). The laser apparatus 70 is movably disposed on the second rail apparatus 303. The laser apparatus 70 is able to move linearly on the second rail apparatus 303 in a second direction (i.e., direction X illustrated in FIG. 1 and FIG. 2). The first direction is different from the second direction. In this implementation, the number of the first rail apparatus 301 is two, and the second rail apparatus 303 is disposed on the two first rail apparatuses 301. The laser apparatus 70 is configured to emit a laser light to perform laser machining on the workpiece. It can be understood that the support apparatus 10 may be omitted.

The laser machining device 100 can be disassembled into several modules, and particularly, the first rail apparatus 301 and the second rail apparatus 303 each can be assembled into a complete module, such an assembly difficulty and assembly time of a user can be reduced, and a best movement performance after assembling can be ensured.

The support apparatus 10 includes a support frame 11 and four foot pad assemblies 13. The four foot pad assemblies 13 are fixed to the support frame 11 at four corners of the bottom of the support frame 11 respectively, to increase the height of the laser machining device 100. It can be understood that the number of foot pad assemblies 13 at each of the four corners of the bottom of the support frame 11 is not limited in the present disclosure, and may be one or more.

Figure 3:
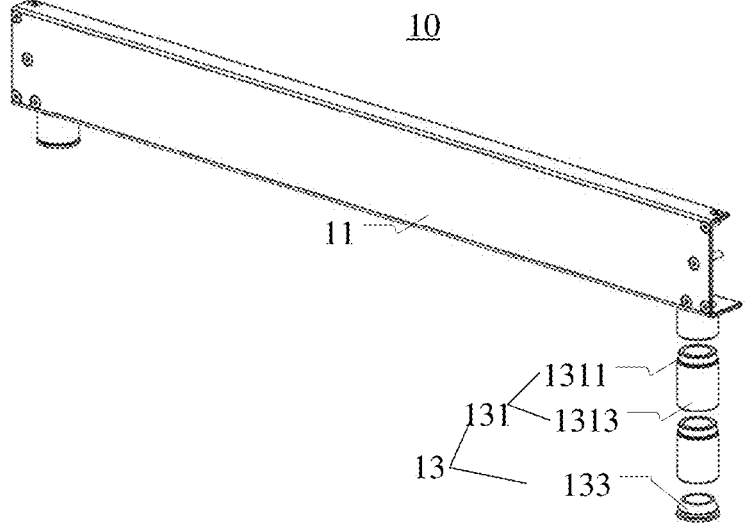
FIG. 3 is an exploded schematic perspective view of a support apparatus.

Reference can be made to FIG. 3. A foot pad assembly 13 includes multiple foot pads 131 and flexible pads 133. Each of the multiple foot pads 131 includes a first end 1311 and a second end 1313 opposite to the first end 1311. A first end 1311 of a first foot pad 131 of the multiple foot pads 131 is fixed to the bottom of the support frame 11. Between any two adjacent foot pads 131, a first end 1311 of one foot pad 131 is connected with a second end 1313 of the other foot pad 131. In this implementation, the first end 1311 of the foot pad 131 has an outer diameter smaller than the second end 1313 of the foot pad 131. Between any two adjacent foot pads 131, the first end 1311 of one foot pad 131 is inserted into the second end 1313 of the other foot pad 131. A flexible pad 133 is inserted into a second end 1313 of a last foot pad 131 of the multiple foot pads 131, to reduce a possibility of movement of the laser machining device 100 relative to the ground or the like and reduce noise.

By adjusting the number of foot pads 131, different pad heights of the laser machining device 100 can be realized. For example, in some machining sites, the support frame 11 needs to be padded with three foot pads 131, and in some machining sites, the support frame 11 only needs to be padded with one foot pad 131. When a pad height needs to be increased, the flexible pad 133 is removed first, and then a first end 1311 of a new foot pad 131 is inserted into the second end 1313 of the last foot pad 131. When the pad height needs to be decreased, the flexible pad 133 is removed first, and then one or more foot pads 131 are removed. Regardless of whether the pad height is increased or decreased, the flexible pad 133 is inserted into a second end 1313 of a new last foot pad 131 after a desired pad height is reached. With aid of the foot pad assembly 13, the pad height can be increased or decreased quickly, and operation is simple and convenient.

It can be understood that an outer diameter of the first end 1311 of the first foot pad 131 of the multiple foot pads 131 may not be smaller than an outer diameter of a second end 1313 of the first foot pad 131 of the multiple foot pads 131.

It can be understood that in some implementations, two adjacent foot pads 131 may be connected by screwing or the like.

It can be understood that in some implementations, the number of foot pads 131 may be one or two.

It can be understood that in some implementations, the foot pad assembly 13 may be omitted.

Figure 4:
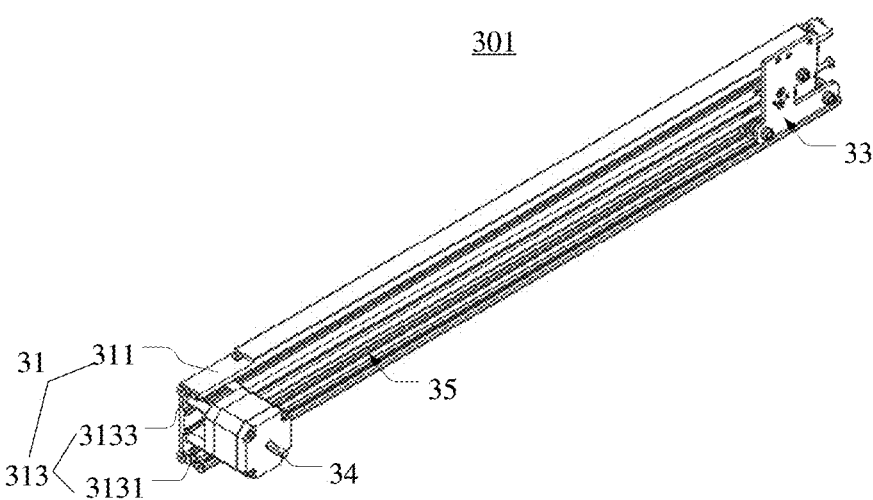
FIG. 4 is a schematic perspective assembly view of a first rail apparatus.
Figure 5:
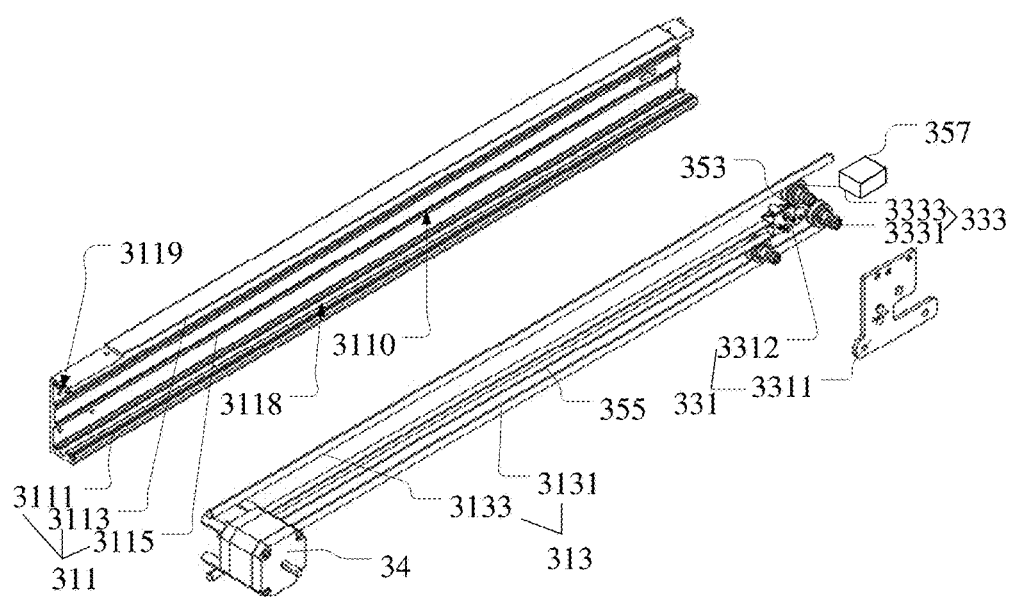
FIG. 5 is an exploded schematic perspective view of a first rail apparatus.

Reference can be made to FIG. 4 and FIG. 5. The first rail apparatus 301 includes a rail frame assembly 31, a mounting assembly 33, a driving member 34, and a transmission assembly 35. The mounting assembly 33 is movably disposed on the rail frame assembly 31 to carry the second rail apparatus 303 and the laser apparatus 70. The transmission assembly 35 is connected with the mounting assembly 33. The driving member 34 is configured to drive the transmission assembly 35 to drive the mounting assembly 33 to move linearly on the rail frame assembly 31 in the first direction.

The rail frame assembly 31 includes a rail frame 311 and a guide shaft 313 fixed to the rail frame 311. The rail frame 311 includes a first connecting portion 3111, a second connecting portion 3113, and a third connecting portion 3115. The third connecting portion 3115 is fixedly connected between the first connecting portion 3111 and the second connecting portion 3113. The first connecting portion 3111, the second connecting portion 3113, and the third connecting portion 3115 cooperatively define a groove 3110. The groove 3110 is substantially U-shaped. The first connecting portion 3111 and the second connecting portion 3113 are disposed opposite to each other in a third direction.

Figure 6:
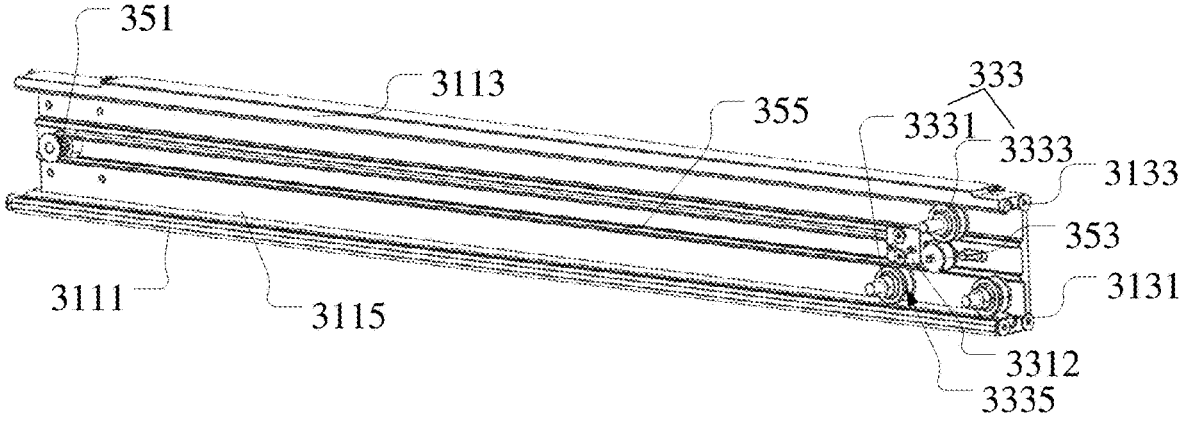
FIG. 6 is a schematic perspective view of a partial structure of a first rail apparatus.

Reference can be made to FIG. 5 and FIG. 6 together. The first connecting portion 3111 defines a first accommodating groove 3118 communicating with the groove 3110, and the guide shaft 313 is accommodated in the first accommodating groove 3118. The second connecting portion 3113 defines the second accommodating groove 3119 communicating with the groove 3110, and the guide shaft 313 is accommodated in the second accommodating groove 3119.

In this implementation, the rail frame 311 is made of special materials and made by extrusion molding through a mold to have a relatively strong strength. It can be understood that a molding mode of the rail frame 311 is not limited in the present disclosure, for example, the rail frame 311 may be assembled by the first connecting portion 3111, the second connecting portion 3113, and the third connecting portion 3115 which are separated from one another.

It can be understood that the third connecting portion 3115 may be omitted in the rail frame 311. The first connecting portion 3111 is fixedly connected with the second connecting portion 3113. The first connecting portion 3111 and the second connecting portion 3113 cooperatively define a V-shaped groove.

The guide shaft 313 includes a first guide shaft 3131 and a second guide shaft 3133. The first guide shaft 3131 is fixedly accommodated in the first accommodating groove 3118 of the first connecting portion 3111, to guide movement of the mounting assembly 33 relative to the rail frame 311. The second guide shaft 3133 is fixedly accommodated in the second accommodating groove 3119 of the second connecting portion 3113, to guide the movement of the mounting assembly 33 relative to the rail frame 311. The first guide shaft 3131 is embedded in a side wall of the groove 3110, and the second guide shaft 3133 is embedded in a side wall of the groove 3110, which is beneficial to miniaturization of the first rail apparatus 301. In this implementation, the first accommodating groove 3118 and the second accommodating groove 3119 each extend in the first direction. The first guide shaft 3131 has an axis extending in the first direction. The second guide shaft 3133 has an axis extending in the first direction. The first guide shaft 3131 is spaced apart from the second guide shaft 3133 in the third direction (i.e., direction Z illustrated in FIG. 1). In other words, the first guide shaft 3131 and the second guide shaft 3133 are arranged in a direction different from an axial direction of the first guide shaft 3131, that is, an arrangement direction of the first guide shaft 3131 and the second guide shaft 3133 is different from the axial direction of the first guide shaft 3131.

In this implementation, the first guide shaft 3131 is accommodated in the first accommodating groove 3118 of the first connecting portion 3111 through a mortise-and-tenon joint. The first accommodating groove 3118 has a circular arc-shaped cross section, and a width of an opening of the first accommodating groove 3118 is smaller than the maximum diameter of the circular arc-shaped cross section of the first accommodating groove 3118. During mounting, the first guide shaft 3131 is squeezed into the first accommodating groove 3118 through the opening of the first accommodating groove 3118, and the first guide shaft 3131 is in interference fit with an inner wall of the first connecting groove 3118 of the first connecting portion 3111, which is beneficial to improving a connection strength between the first guide shaft 3131 and the rail frame 311, such that assembly is fast and a structure is stable. The second guide shaft 3133 is accommodated in the second accommodating groove 3119 of the second connecting portion 3113 through a mortise-and-tenon joint. The second guide shaft 3133 is in interference fit with an inner wall of the second accommodating groove 3119 of the second connecting portion 3113, which is beneficial to improving a connection strength between the second guide shaft 3133 and the rail frame 311. Similar to the first accommodating groove 3118, the second accommodating groove 3119 has a circular arc-shaped cross section. A width of an opening of the second accommodating groove 3119 is smaller than the maximum diameter of the circular arc-shaped cross section of the second accommodating groove 3119. During mounting, the second guide shaft 3133 is squeezed into the second accommodating groove 3119 through the opening of the second accommodating groove 3119. A clearance of the first rail apparatus 301 in the third direction is ensured by a stable distance between the first guide shaft 3131 and the second guide shaft 313 on the rail frame 311.

It can be understood that the first accommodating groove 3118 of the first connecting portion 3111 may be omitted, and the first guide shaft 3131 may be directly fixed to the first connecting portion 3111.

It can be understood that the second accommodating groove 3119 of the second connection portion 3113 may be omitted, and the second guide shaft 3133 may be directly fixed to the second connection portion 3113.

It can be understood that the number of the guide shaft 313 may be one.

The mounting assembly 33 includes a mounting base 331 and a pulley 333. The mounting base 331 is movably connected with the rail frame 311 of the first rail apparatus 301 through the pulley 333.

Figure 7:
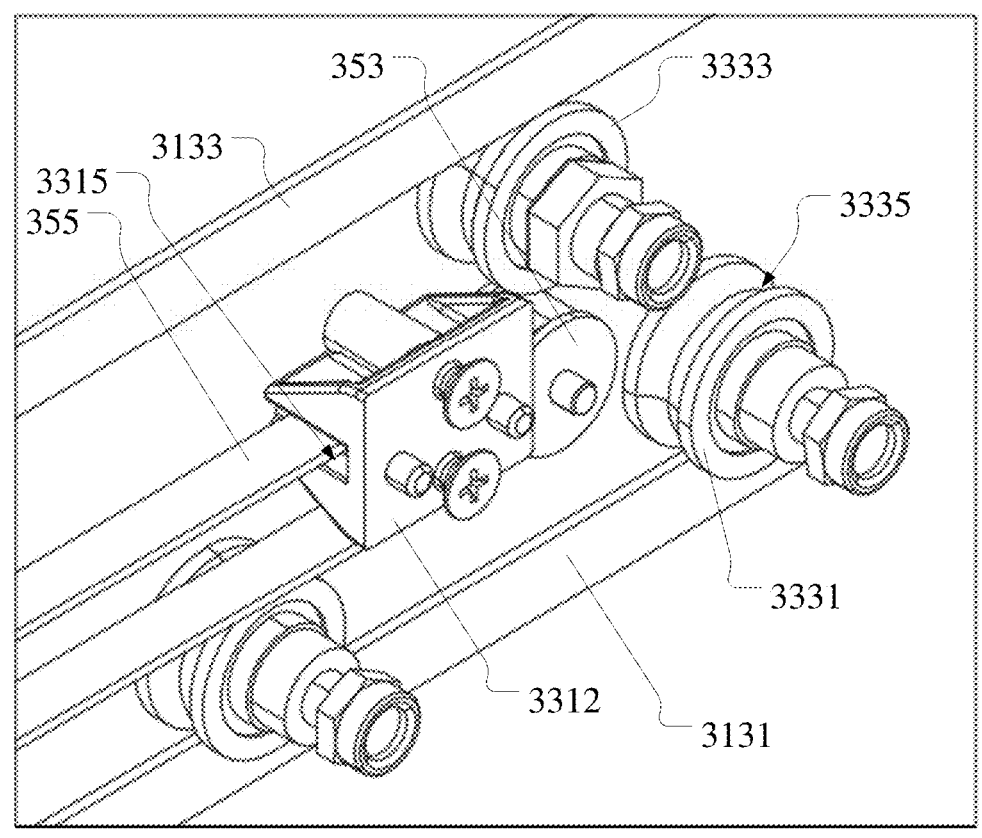
FIG. 7 is a partial enlarged schematic view of the first rail apparatus illustrated in FIG. 5.

The mounting base 331 includes a mounting plate 3311 and a connecting member 3312 fixed to the mounting plate 3311. The mounting plate 3311 is configured to support the connecting member 3312, the pulley 333, the second rail apparatus 303, and the laser apparatus 70. Reference can be made to FIG. 5, FIG. 6, and FIG. 7 together, and the connecting member 3312 defines a connecting groove 3315 to connect the transmission assembly 35.

The pulley 333 includes a first pulley 3331 and a second pulley 3333. The first pulley 3331 is rotatably mounted on the mounting plate 3311 and slidably connected with the first guide shaft 3131. The first pulley 3331 is accommodated in the groove 3110 and disposed between the first guide shaft

3131 and the second guide shaft 3133. The mounting plate 3311 covers the groove 3110. The first pulley 3331 is disposed between the mounting plate 3311 and the third connecting portion 3115 of the rail frame 311. When the transmission assembly 35 drives the mounting base 331 to move, the first pulley 3331 rolls along the first guide shaft 3131. The first pulley 3331 is able to roll along the first guide shaft 3131, that is, the first pulley 3331 is connected with the first guide shaft 3131 in a rolling manner, such that friction between the first pulley 3331 and the first guide shaft 3131 is reduced.

In this implementation, the first pulley 3331 defines an annular sliding groove 3335 in an outer wall of the first pulley 3331. The first guide shaft 3131 passes through the sliding groove 3335. The first guide shaft 3131 is slidably connected with the sliding groove 3335 of the first pulley 3331. The first guide shaft 3131 is limited by the sliding groove 3335, such that a possibility that the first pulley 3331 is separated from the first guide shaft 3131 is reduced. It can be understood that the sliding groove 3335 of the first pulley 3331 may be omitted, the first guide shaft 3131 may define a guide groove, and the first pulley 3331 may be slidably connected with the guide groove of the first guide shaft 3131. It can be understood that the first pulley 3331 may be directly fixed to the mounting plate 3311.

The second pulley 3333 is rotatably mounted on the mounting plate 3311 and slidably connected with the second guide shaft 3133. The second pulley 3333 is accommodated in the groove 3110 and disposed between the first guide shaft 3131 and the second guide shaft 3133. When the transmission assembly 35 drives the connecting member 3312 to drive the mounting base 331 to move, the second pulley 3333 rolls along the second guide shaft 3133.

The second pulley 3333 is able to roll along the second guide shaft 3133, that is, the second pulley 3333 is connected with the second guide shaft 3133 in a rolling manner, such that friction between the second pulley 3333 and the second guide shaft 3133 is reduced. In this implementation, the second pulley 3333 defines an annular sliding groove 3335 in an outer wall of the second pulley 3333. The second guide shaft 3133 passes through the sliding groove 3335 of the second pulley 3333. The second guide shaft 3133 is slidably connected with the sliding groove 3335 of the second pulley 3333. The second guide shaft 3133 is limited by the sliding groove 3335 of the second pulley 3333, such that a possibility that the second pulley 3333 is separated from the second guide shaft 3133 is reduced. It can be understood that the sliding groove 3335 of the second pulley 3333 may be omitted, the second guide shaft 3133 may define a guide groove, and the second pulley 3333 may be slidably connected with the guide groove of the second guide shaft 3133. It can be understood that the second pulley 3333 may be directly fixed to the mounting plate 3311.

The first pulley 3331 is in fit with the first guide shaft 3131, and the second pulley 3333 is in fit with the second guide shaft 3133, such that a clearance of the first rail apparatus 301 in the first direction is ensured. The first guide shaft 3131 and the second guide shaft 3133 guide movement of the mounting base 331 in the first direction. In this way, smoothness and movement accuracy of linear movement of the mounting base 331 in the first direction are improved, noise is reduced, and wear between the mounting assembly 33 and the rail frame 311 is reduced, such that the laser machining device 100 has characteristics of high accuracy, high strength, long service life, and low noise.

In addition, the mounting plate 3311 covers the groove 3110, the first pulley 3331 is disposed between the mounting plate 3311 and the rail frame 311, and the second pulley 3333 is disposed between the mounting plate 3311 and the rail frame 311, such that the first pulley 3331 and the second pulley 3333 each are hidden in the groove 3110, which is beneficial to reducing interference of other components in movement of the first pulley 3331 and the second pulley 3333, and is also beneficial to development in miniaturization of the first rail apparatus 301.

Reference can be made to FIG. 4 and FIG. 5 again. The driving member 34 is fixed to the third connecting portion 3115 of the rail frame 311. The driving member 34 has a driving shaft connected with the transmission assembly 35 to drive movement of the transmission assembly 35. In this implementation, the two first rail apparatuses 301 share the same driving member 34 through a linkage 305 (as illustrated in FIG. 2). The driving member 34 is fixed to the rail frame 311 of one of the two first rail apparatuses 301 to drive mounting assemblies 33 of the two first rail apparatuses 301 to move. It can be understood that each first rail apparatus 301 may be equipped with one driving member 34.

Reference can be made to FIG. 4 to FIG. 7, the transmission assembly 35 includes a driving gear 351, a driven gear 353, and a synchronous belt 355. The driving gear 351 is connected with the driving shaft of the driving member 34. The driven gear 353 is rotatably disposed on the rail frame 311. The synchronous belt 355 is wound around the driving gear 351 and the driven gear 353. The synchronous belt 355 fixedly passes through the connecting groove 3315. In this implementation, the driving member 34 is an electric rotating machine. The driving member 34 drives the driving gear 351 to rotate, and the driving gear 351 drives the synchronous belt 355. When the driving member 34 drives the driving gear 351 to rotate, the driving gear 351 drives the synchronous belt 355 to move, so as to drive the mounting assembly 33 to move linearly along the first guide shaft 3131 and the second guide shaft 3133.

The transmission assembly 35 further includes a fixed bracket 357 (as illustrated in FIG. 5). The fixed bracket 357 is fixed to the rail frame 311. The fixed bracket 357 supports the driven gear 353. It can be understood that the connecting member 3312 may be omitted, and the mounting plate 3311 is directly connected with the synchronous belt 355.

It can be understood that the transmission assembly 35 may be omitted, the driving member 34 is directly connected with the mounting base 331, the driving member 34 may be a linear motor, and the driving member 34 drives the mounting base 331 to move linearly in the first direction.

When the laser machining device 100 needs to perform laser engraving or cutting on a workpiece, the driving member 34 drives the driving gear 351 to rotate, and the driving gear 351 drives the second rail apparatus 303 to move linearly on the first rail apparatus 301 in the first direction. The laser apparatus 70 moves linearly on the second rail apparatus 303 in the second direction. Therefore, a machining position of the laser apparatus 70 is changed through movement of the second rail apparatus 303 on the first rail apparatus 301 and movement of the laser apparatus 70 on the second rail apparatus 303.

It can be understood that the second rail apparatus 303 may have a structure similar to the first the rail apparatus 301. In other words, it can be understood that the structure of the first the rail apparatus 301 in the present disclosure can be applied to a guide mechanism of a linear movement rail of the laser machining device 100, such as, applied to linear movement rails in any direction such as axis X, axis Y, axis Z, and the like in FIG. 1.

Figure 8:
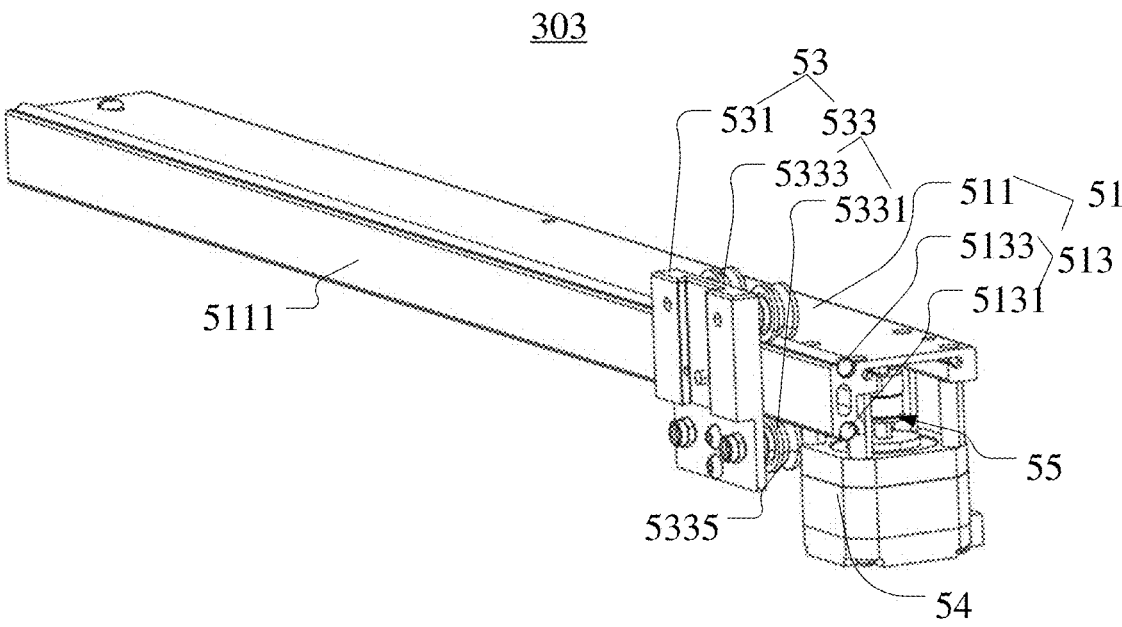
FIG. 8 is a schematic perspective assembly view of a second rail apparatus.

Reference can be made to FIG. 8. The second rail apparatus 303 includes a rail frame assembly 51, a mounting assembly 53, a driving member 54, and a transmission assembly 55. The mounting assembly 53 is movably disposed on the rail frame assembly 51 to carry the laser apparatus 70. The transmission assembly 55 is connected with the mounting assembly 53. The driving member 54 is configured to drive the transmission assembly 55 to drive the mounting assembly 53 to move linearly on the rail frame assembly 51 in the second direction.

Figure 9:
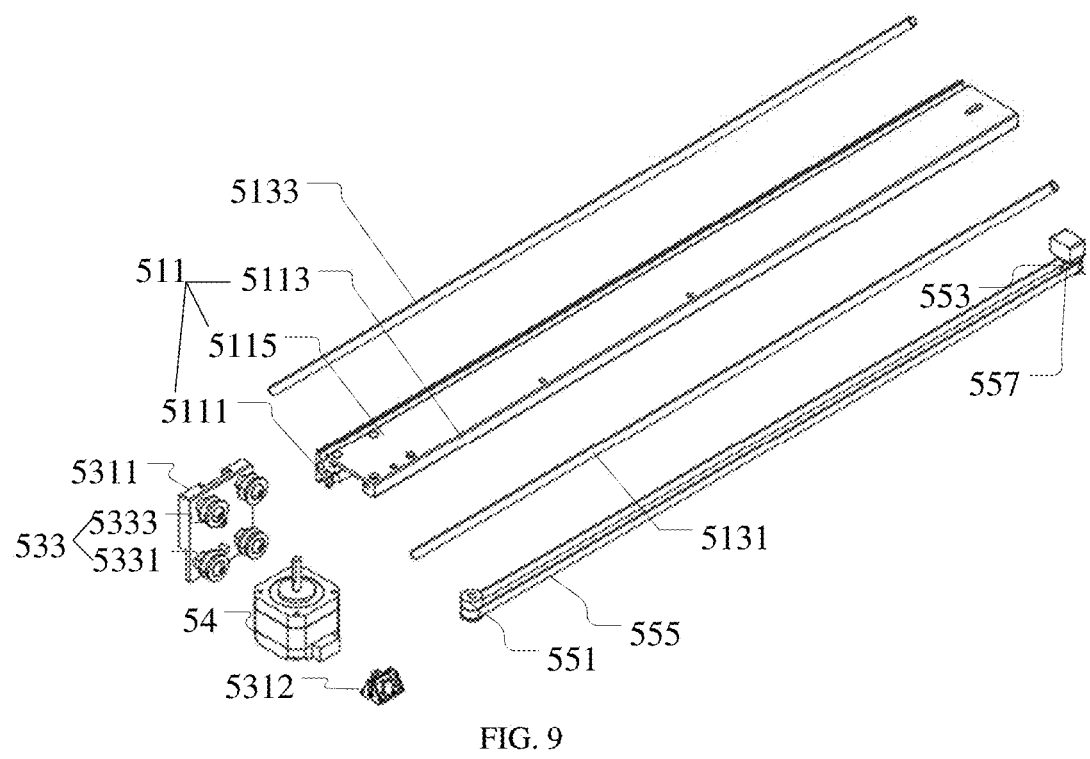
FIG. 9 is an exploded schematic perspective view of a second rail apparatus.
Figure 10:
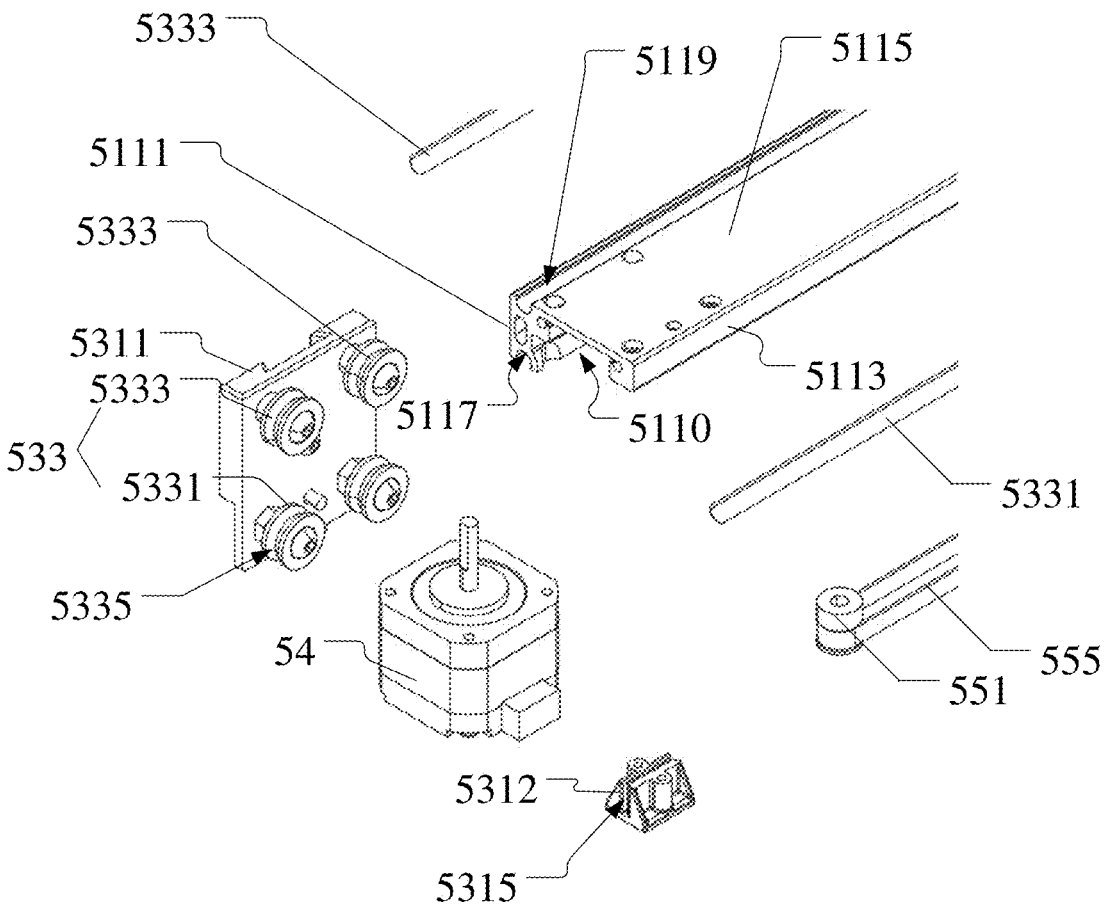
FIG. 10 is a partial schematic view of the second rail apparatus illustrated in FIG. 9.

Reference can be made to FIG. 9 and FIG. 10. The rail frame assembly 51 includes a rail frame 511 and a guide shaft 513 on the rail frame 511. The rail frame 511 includes a first connecting portion 5111, a second connecting portion 5113, and a third connecting portion 5115. The third connecting portion 5115 is fixedly connected between the first connecting portion 5111 and the second connecting portion 5113. The first connecting portion 5111, the second connecting portion 5113, and the third connecting portion 5115 cooperatively define a groove 5110, and the transmission assembly 55 is accommodated in the groove 5110. The groove 5110 is substantially U-shaped. The first connecting portion 5111 and the second connecting portion 5113 are disposed opposite to each other in the first direction.

The first connecting portion 5111 and the second connecting portion 5113 are disposed at a side of the rail frame 511 facing the bottom of the laser machining device 100. The first connecting portion 5111 defines accommodating grooves at two opposite ends of the first connecting portion 5111 in the third direction, and the guide shaft 513 is accommodated in the accommodating grooves. Specifically, one end of the first connecting portion 5111 away from the third connecting portion 5115 defines a first accommodating groove 5117, and the guide shaft 513 is accommodated in the first accommodating groove 5117. One end of the first connecting portion 5111 close to the third connecting portion 5115 defines a second accommodating groove 5119, and the guide shaft 513 is accommodated in the second accommodating groove 5119.

The guide shaft 513 includes a first guide shaft 5131 and a second guide shaft 5133. An arrangement direction of the first guide shaft 5131 and the second guide shaft 5133 is different from an axial direction of the first guide shaft 5131. In this implementation, the first guide shaft 5131 is accommodated in the first accommodating groove 5117 through a mortise-and-tenon joint, and the second guide shaft 5133 is accommodated in the second accommodating groove 5119 through a mortise-and-tenon joint. Each of the first accommodating groove 5117 and the second accommodating groove 5119 has a circular arc-shaped cross section. A width of an opening of the first accommodating groove 5117 is smaller than the maximum diameter of the circular arc-shaped cross section of the first accommodating groove 5117. During mounting, the first guide shaft 5131 is squeezed into the first accommodating groove 5117 through the opening of the first accommodating groove 5117, and the first guide shaft 5131 is in interference fit with an inner wall of the first accommodating groove 5117, which is beneficial to improving a connection strength between the first guide shaft 5131 and the rail frame 511, such that assembly is fast and a structure is stable. A width of an opening of the second accommodating groove 5119 is smaller than the maximum diameter of the circular arc-shaped cross section of the second accommodating groove 5119. During mounting, the second guide shaft 5133 is squeezed into the second accommodating groove 5119 through the opening of the second accommodating groove 5119, and the second guide shaft 5133 is in interference fit with an inner wall of the second accommodating groove 5119, which is beneficial to improving a connection strength between the second guide shaft 5133 and the rail frame 511, such that the assembly is fast and the structure is stable. A clearance of the second rail apparatus 303 in the third direction is ensured by a stable distance between the first guide shaft 5131 and the second guide shaft 5133 on the rail frame 511.

The mounting assembly 53 includes a mounting base 531 and a pulley 533. The mounting base 531 is movably connected with the rail frame 511 through the pulley 533.

The mounting base 531 includes a mounting plate 5311 and a connecting member 5312 fixed to the mounting plate 5311. The mounting plate 5311 is movably connected with the laser apparatus 70 to carry the laser apparatus 70. The connecting member 5312 defines a connecting groove 5315 to connect the transmission assembly 55.

The pulley 533 includes a first pulley 5331 and a second pulley 5333. The first pulley 5331 is rotatably mounted on the mounting plate 5311 and slidably connected with the first guide shaft 5131. When the transmission assembly 55 drives the mounting base 531 to move, the first pulley 5331 rolls along the first guide shaft 5131. The first pulley 5331 is able to roll along the first guide shaft 5131, that is, the first pulley 5331 is connected with the first guide shaft 5131 in a rolling manner, such that friction between the first pulley 5331 and the first guide shaft 5131 is reduced.

In this implementation, the first pulley 5331 defines an annular sliding groove 5335 in an outer wall of the first pulley 5331. The first guide shaft 5131 passes through the sliding groove 5335. The first guide shaft 5131 is slidably connected with the sliding grove 5335 of the first pulley 5331. The first guide shaft 5131 is limited by the sliding groove 5335, such that a possibility that the first pulley 5331 is separated from the first guide shaft 5131 is reduced. It can be understood that the sliding groove 5335 may be omitted, the first guide shaft 5131 may define a guide groove, and the first pulley 5331 may be slidably connected with the guide groove of the first guide shaft 5131. It can be understood that the first pulley 5331 may be directly fixed to the mounting plate 5311.

The second pulley 5333 is rotatably mounted on the mounting plate 5311 and slidably connected with the second guide shaft 5133. The first pulley 5331 and the second pulley 5333 are arranged on the mounting base 531 in the third direction. The first guide shaft 5131 is disposed between the first pulley 5331 and the second pulley 5333. The second guide shaft 5133 is disposed between the first pulley 5331 and the second pulley 5333. The first connecting portion 5111 is disposed between the first pulley 5331 and the second pulley 5333.

The first connecting portion 5111 is disposed between the first pulley 5331 and the second pulley 5333. When the transmission assembly 55 drives the mounting base 531 to move, the second pulley 5333 is able to roll along the second guide shaft 5133. The second pulley 5333 is able to roll along the second guide shaft 5133, that is, the second pulley 5333 is connected with the second guide shaft 5133 in a rolling manner, such that friction between the second pulley 5333 and the second guide shaft 5133 is reduced.

In this implementation, the second pulley 5333 defines an annular sliding groove 5335 in an outer wall of the second pulley 5333. The second guide shaft 5133 passes through the sliding groove 5335. The second guide shaft 5133 is slidably connected with the sliding groove 5335 of the second pulley 5333. The second guide shaft 5133 is limited by the sliding groove 5335, such that a possibility that the second pulley 5333 is separated from the second guide shaft 5133 is reduced. It can be understood that the sliding groove 5335 may be omitted, the second guide shaft 5133 may define a guide groove, and the second pulley 5333 may be slidably connected with the guide groove of the second guide shaft 5133. It can be understood that the second pulley 5333 may be directly fixed to the mounting plate 5311.

The first pulley 5331 is in fit with the first guide shaft 5131, and the second pulley 5333 is in fit with the second guide shaft 5133, such that a clearance of the second rail apparatus 303 in the second direction is ensured. The first guide shaft 5131 and the second guide shaft 5133 guide movement of the mounting base 531 in the second direction. In this way, smoothness and movement accuracy of linear movement of the mounting base 531 in the second direction are improved, noise is reduced, and wear between the mounting assembly 53 and the rail frame 511 is reduced, such that the laser machining device 100 has characteristics of high accuracy, high strength, long service life, and low noise.

It can be understood that the first accommodating groove 5117 and the second accommodating groove 5119 may be omitted, and the first guide shaft 5131 and the second guide shaft 5133 may be directly fixed to the rail frame 511.

The driving member 54 is fixed to the third connecting portion 5115 of the rail frame 511. The driving member 54 has a driving shaft connected with the transmission assembly 55 to drive movement of the transmission assembly 55.

Figure 11:
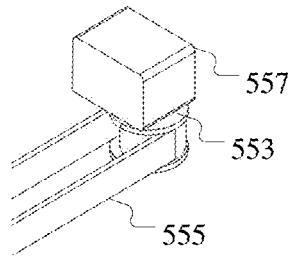
FIG. 11 is another partial schematic view of the second rail apparatus illustrated in FIG. 9.

The transmission assembly 55 is accommodated in the groove 5110. The transmission assembly 55 includes a driving gear 551 (as illustrated in FIG. 9 and FIG. 10), a driven gear 553 (as illustrated in FIG. 11), and a synchronous belt 555. The driving gear 551 is connected with the driving shaft of the driving member 54. The driven gear 553 is rotatably disposed on the rail frame 511. The synchronous belt 555 is wound around the drive gear 551 and the driven gear 553. The synchronous belt 555 fixedly passes through the connecting groove 5315. In this implementation, the driving member 54 is an electric rotating machine. The driving member 54 drives the driving gear 551 to rotate, and the driving gear 551 drives the synchronous belt 555. When the driving member 54 drives the driving gear 551 to rotate, the driving gear 551 drives the synchronous belt 555 to move, so as to drive the mounting assembly 53 to move linearly along the first guide shaft 5131 and the second guide shaft 5133.

The transmission assembly 55 further includes a fixed bracket 557 fixed to the rail frame 511, and the driven gear 553 is rotatably disposed on the fixed bracket 557, such that the driven gear 553 is rotatably disposed on the rail frame 511.

It can be understood that the connecting member 5312 may be omitted, and the mounting plate 5311 is directly connected with the synchronous belt 555.

It can be understood that the transmission assembly 55 may be omitted, the driving member 54 is directly connected with the mounting plate 5311, the driving member 54 may be a linear motor, and the driving member 54 drives the mounting plate 5311 to move linearly in the second direction.

When the laser machining device 100 needs to perform laser engraving and cutting on the workpiece, the driving member 54 drives the driving gear 551 to rotate, and the driving gear 551 drives the laser apparatus 70 to move linearly on the second rail apparatus 303 in the second direction. The second rail apparatus 303 moves linearly on the rail apparatus 30 in the first direction. Therefore, a machining position of the laser apparatus 70 is changed through movement of the second rail apparatus 303 on the rail apparatus 30 and movement of the laser apparatus 70 on the second rail apparatus 303.

It can be understood that a structure of the second rail apparatus 303 in the present disclosure can be applied to a guide mechanism of a linear movement rail of the laser machining device 100, such as, applied to linear movement rails in any direction such as axis X, axis Y, axis Z, and the like in FIG. 1.

Figure 12:
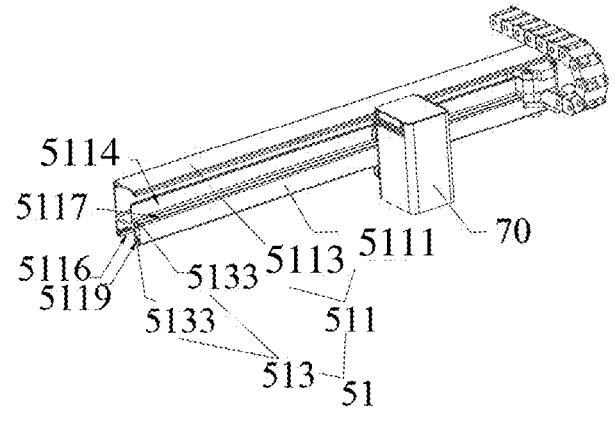
FIG. 12 is a schematic perspective view assembly of a second rail apparatus and a laser apparatus in another implementation of the present disclosure.
Figure 13:
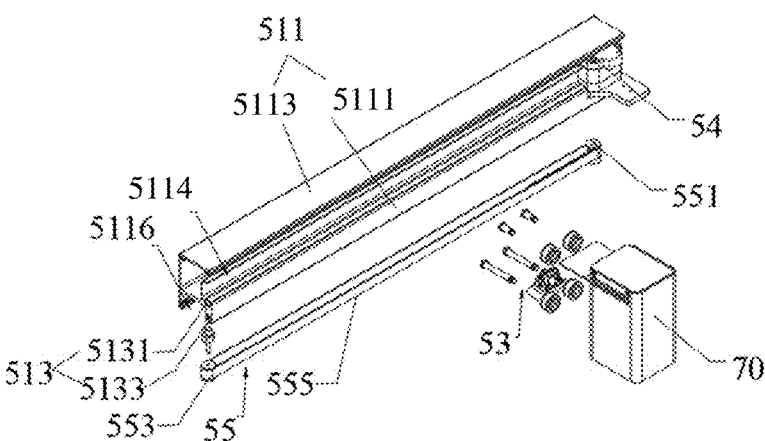
FIG. 13 is an exploded schematic perspective view of a second rail apparatus and a laser apparatus in another implementation of the present disclosure.

It can be understood that the structure of the rail frame 511 is not limited in the present disclosure, and a specific position where the guide shaft 513 is fixed to the rail frame 511 is not limited in the present disclosure. In an implementation, reference can be made to FIG. 12 and FIG. 13. The rail frame 511 includes a first connecting portion 5111 and a second connecting portion 5113 fixedly connected with the first connecting portion 5111. The first connecting portion 5111 defines a groove 5116 at a surface of the first connecting portion 5111 away from the second connecting portion 5113, and the transmission assembly 54 is accommodated in the groove 5116. The second connecting portion 5113 defines a guide groove 5114, and the mounting assembly 53 is accommodated in the guide groove 5114. The guide groove 5114 has an opening direction different from the groove 5116. An opening of the guide groove 5114 is defined toward the laser apparatus 70, and an opening of the groove 5116 is defined toward the bottom of the laser machining device 100. The first guide shaft 5131 is fixed to an inner wall of the guide groove 5114, and the second guide shaft 5133 is fixed to an end surface of the first connecting portion 5111 away from the second connecting portion 5113. The inner wall of the guide groove 5114 defines a first accommodating groove 5117 communicating with the guide groove 5114. A surface the first connecting portion 5111 away from the guide groove 5114 defines a second accommodating groove 5119. The first guide shaft 5131 is fixedly accommodated in the first accommodating groove 5117. The second guide shaft 5133 is fixedly accommodated in the second accommodating groove 5119 of the rail frame 511. The first guide shaft 5131 is accommodated in the first accommodating groove 5117 through a mortise-and-tenon joint, and the second guide shaft 5133 is accommodated in the second accommodating groove 5119 through a mortise-and-tenon joint. The mounting plate 5311 covers the guide groove 5114, and the first pulley 5331 is disposed between the mounting plate 5311 and the second connecting portion 5113 of the rail frame 511. The mounting plate 5311 covers the guide groove 5114, the first pulley 5331 is disposed between the mounting plate 5311 and the rail frame 511, the second pulley 5333 is disposed at a side of the first connecting portion 5111 away from the first guide shaft 5131, such that the first pulley 5331 is hidden in the guide groove 5114, and the second pulley 5333 is hidden under the rail frame 511, which is beneficial to reducing interference of other components in movement of the first pulley 5331 and the second pulley 5333, and is also beneficial to development in miniaturization of the second rail apparatus 303.

Figure 14:
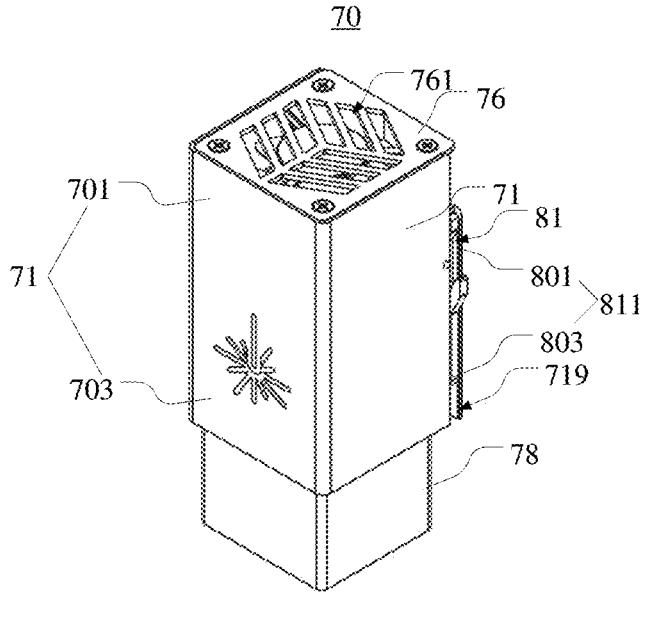
FIG. 14 is a schematic perspective assembly view of a laser apparatus.
Figure 15:
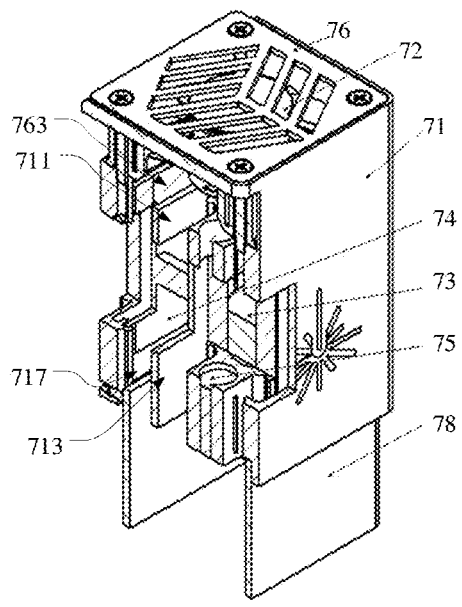
FIG. 15 is a perspective cross-sectional view of the laser apparatus illustrated in FIG. 14.
Figure 16:
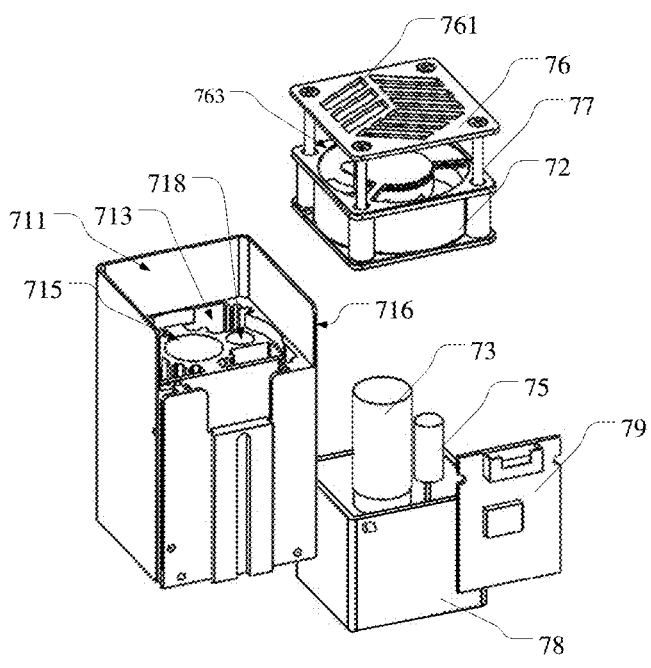
FIG. 16 is an exploded schematic perspective view of the laser apparatus illustrated in FIG. 14.
Figure 17:
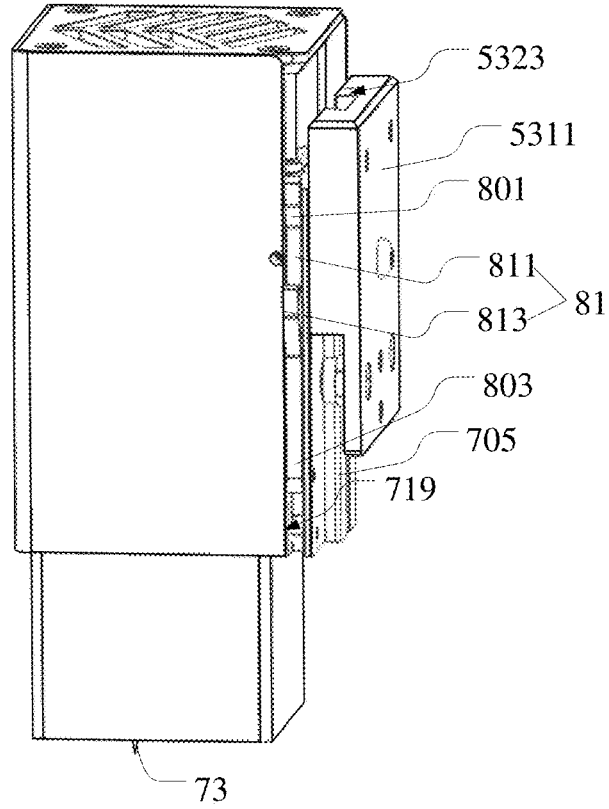
FIG. 17 is a schematic view of a laser apparatus assembled with a mounting plate of a second rail apparatus.
Figure 18:
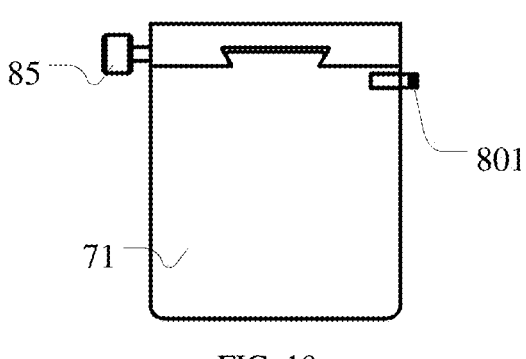
FIG. 18 is a rear view of a laser apparatus in an implementation.
Figure 19:
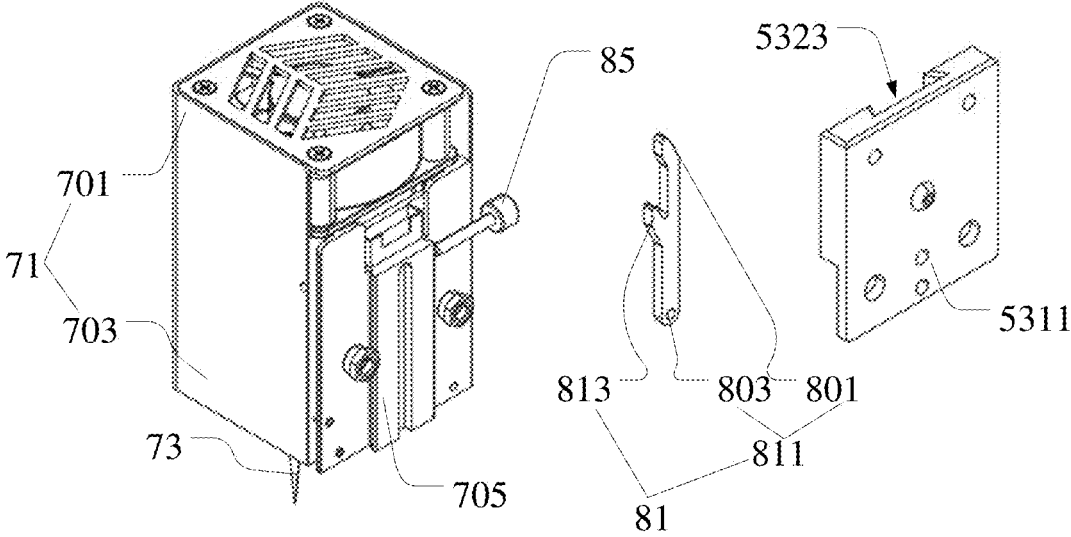
FIG. 19 is an exploded schematic perspective view of a laser apparatus and a mounting plate.
Figure 20:
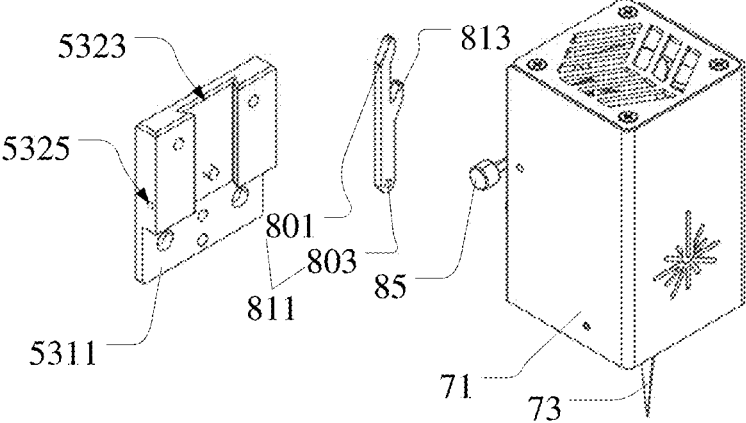
FIG. 20 is an exploded schematic perspective view of a laser apparatus and a mounting plate from another visual angle.

Reference can be made to FIG. 14, FIG. 15, and FIG. 16. The laser apparatus 70 includes a base 71, a cooling fan 72, and a laser 73. The cooling fan 72 and the laser 73 each are fixed to the base 71.

The base 71 includes a first end 701 and a second end 703 opposite to the first end 701. The base 71 defines a fan mounting groove 711 at the first end 701 of the base 71, and the cooling fan 72 is accommodated in the fan mounting groove 711. The fan mounting groove 711 defines a cooling ventilation duct 713 and a first accommodating cavity 715 at a bottom wall of the fan mounting groove 711. A side wall of the base 71 defines an opening 716 communicating with the fan mounting groove 711 to facilitate entry of the cooling fan 72 into the fan mounting groove 711 or exit of the cooling fan 72 from the fan mounting groove 711. The cooling ventilation duct 713 penetrates through an end surface of the second end 703 of the base 71 to dissipate heat. The laser 73 is accommodated in the first accommodating cavity 715. In this implementation, the base 71 is formed integrally.

The cooling fan 72 is fixedly accommodated in the fan mounting groove 711, and the cooling fan 72 is configured to dissipate heat generated by components such as the laser 73 and the like during operation, such that the components such as the laser 73 and the like can operate in a normal operating temperature range. Since the cooling fan 72 is disposed in the base 71, the cooling fan 72 is not easily polluted by dust generated by the laser apparatus 70 during machining of the laser apparatus 70, and a space utilization rate of the base 71 is also improved. In addition, the cooling fan 72 is hidden in the base 71, which is beneficial to improving a structural simplicity of the laser apparatus 70.

The laser 73 is fixed in the first accommodating cavity 715. The laser 73 is configured to emit a laser light to perform laser machining on the workpiece. In this implementation, the laser 73 is a solid-state laser.

The laser apparatus 70 further includes a circuit board 74. The base 71 defines a mounting cavity 717 for the circuit board 74. The mounting cavity 717 for the circuit board 74 communicates with the cooling ventilation duct 713. The circuit board 74 is accommodated in the mounting cavity 717 for the circuit board 74. The circuit board 74 is provided with a control circuit. The cooling fan 72 is electrically connected with the control circuit of the circuit board 74, and the laser 73 is electrically connected with the control circuit of the circuit board 74. Since the circuit board 74 is disposed in the base 71, the circuit board 74 is not easily polluted by the dust generated of the laser apparatus 70 during the machining of the laser apparatus 70, and it is also beneficial to improving the space utilization rate of the base 71.

It can be understood that a mounting position of the circuit board 74 is not limited in the present disclosure, the mounting cavity 717 for the circuit board 74 may be omitted, and the circuit board 74 may be fixed to the base 71.

The laser apparatus 70 further includes an infrared aiming laser 75 for emitting an infrared aiming laser light. The fan mounting groove 711 further defines a second accommodating cavity 718 at the bottom wall of fan mounting groove 711. The second accommodating cavity 718 penetrates through the end surface of the second end 703 of the base 71. The infrared aiming laser 75 is fixedly accommodated in the second accommodating cavity 718. The infrared aiming laser 75 is configured to emit an intersecting infrared light point as a reference point for positioning the laser 73, such that accuracy of laser machining performed by the laser apparatus 70 is improved.

The laser apparatus 70 further includes a cover plate 76 and a carrier column 77. The carrier column 77 is fixed between the cover plate 76 and the cooling fan 72. The cover plate 76 defines a vent 761. The cooling fan 72 is spaced apart from the cover plate 76 to define a communicating ventilation duct 763 communicating with the cooling ventilation duct 713. The cover plate 76 is disposed at the first end 701 of the base 71, and the cooling fan 72 is hidden in the base 71, such that entry of dust is further reduced during laser machining of the laser machining device 100. In this implementation, the number of load-bearing columns 77 is four, and the four carrier columns 77 are arranged between the cover plate 76 and the cooling fan 72 at intervals. It can be understood that the number of the carrier columns 77 is not limited and may be one.

When the cooling fan 72 is turned on, outside air can enter the base 71 through the vent 761, and the heat generated by the components such as the laser 73 and the like flows out of the base 71 along with the air through the communicating ventilation duct 763 and the cooling ventilation duct 713, such that cooling is realized.

It can be understood that the carrier column 77 may be omitted, and the cover plate 76 may fixedly cover the first end of the base 71 directly.

The laser apparatus 70 further includes a protective housing 78 fixed to the second end 703 of the base 71. The laser 73 has an emitting end for emitting a laser light. The protective housing 78 surrounds the emitting end of the laser 73 to protect the laser 73 and extend the service life of the laser 73.

The laser apparatus 70 further includes a baffle plate 79. The baffle plate 79 is fixedly connected with the first end 701 of the base 71, and the baffle plate 79 covers the opening 716, such that the cooling fan 72 is enclosed in the base 71. Therefore, dust pollution generated by the laser apparatus 70 during the machining of the laser apparatus 70 is further reduced, and a dust-proof ability of the laser apparatus 70 is further improved.

The base 71 integrally defines the cooling ventilation duct 713 and the fan mounting groove 711 communicating with the cooling ventilation duct 713, and the cooling fan 72 is disposed in the fan mounting groove 711, such that the cooling fan 72 is not easily polluted by the dust generated by the laser apparatus 70 during the machining of the laser apparatus 70, and the space utilization rate of the base 71 is also improved. In addition, the cooling fan 72 is hidden in the base 71, which is beneficial to improving the simplicity of the laser apparatus 70. Moreover, the circuit board 74 is disposed in the base 71, such that the circuit board 74 is not easily to be polluted by the dust generated by the laser apparatus 70 during the machining of the laser apparatus 70, and the space utilization rate of the base 71 is improved.

Reference can be made to FIG. 14. The laser apparatus 70 further includes a focusing member 81. The focusing member 81 is movably disposed on the base 71. The focusing member 81 has a focusing end 801. The laser apparatus 70 is operable in a retracting state and an extending state. When the focusing end 801 is stacked on the base 71, the focusing end 801 does not extend beyond the second end 703 of the base 71, and the laser apparatus 70 is in the retracting state. When the focusing end 801 extends beyond the second end 703 of the base 71 to abut against the workpiece, the laser apparatus 70 is in the extending state.

The focusing member 81 is movably disposed on the base 71, that is, the focusing member 81 is not separated from the base 71. When the focusing member 81 is needed for focusing, the focusing end 801 of the focusing member 81 is manually pulled out to expose beyond the second end 703 of the base 71, and the focusing end 801 abuts against the workpiece, such that a distance between the second end 703 of the base 71 and the workpiece is obtained, and a proper height position for machining the laser apparatus 70 is further obtained. When the focusing member 81 is not in use, the focusing end 801 is retracted, such that the focusing end 801 does not extend beyond the second end 703 of the base 71, and the machining of the laser apparatus 70 on the workpiece is not affected. Since the focusing member 81 is not separated from the base 71, the focusing member 81 is not easy to lose, which improves the convenience of use.

More specifically, reference can be made to FIG. 17, FIG. 18, FIG. 19, and FIG. 20 together. The base 71 defines a mounting groove 719 for the focusing member 81 in an outer wall of the base 71 to accommodate the focusing member 81. The mounting groove 719 for the focusing member 81 penetrates through the end surface of the second end 703 of the base 71.

Figure 21:
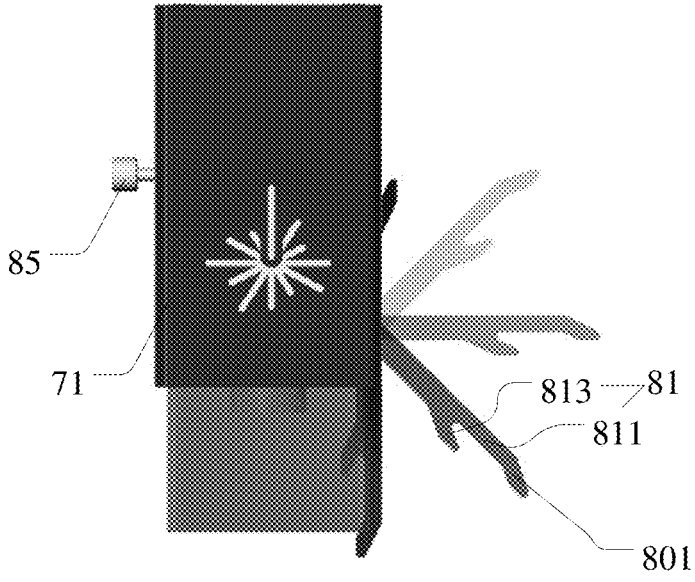
FIG. 21 is a schematic view of a laser apparatus switching from a retracting state to an extending state.

The focusing member 81 includes a plate body 811 and a protrusion 813 protruding from an outer wall of the plate body 811. The board body 811 has the focusing end 801 and the connecting end 803 opposite to the focusing end 801. The connecting end 803 is rotatably connected with an inner wall of the mounting groove 719 for the focusing member 81. In this implementation, the connecting end 803 is disposed at the second end 703 of the base 71. Reference can be made to FIG. 21. The focusing member 81 is configured to rotate by taking a joint of the connection end 803 and the base 71 as a rotating pivot point. The focusing end 801 is accommodated in the mounting groove 719 for the focusing member 81 when the laser apparatus 70 is in the retracting state. The focusing end 801 is accommodated in the mounting groove 719 for the focusing member 81 when the laser apparatus 70 is in the retracting state, that is, the focusing end 801 is hidden in the mounting groove 719 for the focusing member 81 when the focusing member 81 is not in use, which facilitates accommodation of the focusing member 81. When the focusing end 801 is accommodated in the mounting groove 719 for the focusing member 81, the protrusion 813 exposes beyond the mounting groove 719 for the focusing member 81, so as to facilitate the user to rotate the focusing member 81. It can be understood that the mounting groove 719 for the focusing member 81 may be omitted, and the focusing member 81 may be directly connected with the outer wall of the base 71, such that a machining difficulty of the base 71 is reduced.

The outer wall of the base 71 is provided with a first guide portion 705, the mounting plate 5311 is provided with a second guide portion 5323, and the first guide portion 705 is slidably connected with the second guide portion 5323, such that the base 71 is slidable up and down relative to the mounting plate 5311 in the third direction, and a height position for machining the laser 73 can be further adjusted.

In this implementation, the first guide portion 705 is a guide rail. The second guide portion 5323 is a guide-rail groove. The mounting plate 5311 defines an adjustment hole 5325 in an outer wall of the mounting plate 5311. The adjustment hole 5325 communicates with the guide-rail groove. The laser apparatus 70 further includes a locking member 85. The locking member 85 passes through the adjustment hole 5325 and abuts against the guide rail. The locking member 85 is configured to limit a relative position of the mounting plate 5311 and the base 71. The focusing member 81 is able to move along with the base 71. In this implementation, the locking member 85 is a threaded part and the adjustment hole 5325 is a threaded hole.

When the relative position of the mounting plate 5311 and the base 71 needs to be adjusted, the guide rail is released by the locking member 85 to adjust the relative position of the mounting plate 5311 and the base 71. When the relative position of the mounting plate 5311 and the base 71 is determined, the locking member 85 abuts against the guide rail to limit the relative position of the mounting plate 5311 and the base 71.

When the focusing member 81 is needed for focusing, if the focusing end 801 of the focusing member 81 is not in contact with the workpiece, the guide rail is released by the locking member 85 first, and then a position of the base 71 relative to the mounting plate 5311 is adjusted. When the focusing end 801 is in contact with the workpiece, the position of the base 71 relative to the mounting plate 5311 is a position of focal distance. Finally, the locking member 85 is locked with the guide rail.

It can be understood that the first guide portion 705 being the guide rail and the second guide portion 5323 being the guide-rail groove are not limited in the present disclosure. For example, in an implementation, the second guide portion is a guide rail. The first guide portion is a guide-rail groove. The base defines an adjustment hole in an outer wall of the base. The adjustment hole communicates with the guide-rail groove. The laser apparatus further includes a locking member. The locking member passes through the adjustment hole and abuts against the guide rail. The locking member is configured to limit the relative position of the mounting plate and the base.

It can be understood that one of the first guide portion and the second guide portion is the guide rail, the other of the first guide portion and the second guide portion is the guide-rail groove, and the guide rail is slidably accommodated in the guide-rail groove.

It can be understood that the mounting plate 5311 is movably connected with the base 71 to adjust the relative position of the mounting plate and the base.

It can be understood that the focusing member 81 may also have a telescopic structure. When the focusing member 81 is needed for focusing, the focusing end 801 is able to extend beyond the second end 703 of the base 71. When the focusing member 81 is not needed, the focusing end 801 is able to be retracted, such that the focusing end 801 does not extend beyond the second end 703 of the base 71.

Figure 22:
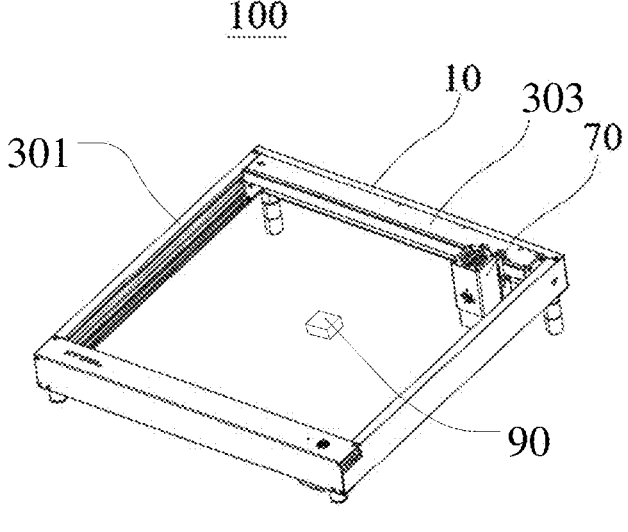
FIG. 22 is a schematic view of a roller apparatus being applied to a laser machining device.

Reference can be made to FIG. 22. The laser machining device 100 further includes a roller apparatus 90, and the roller apparatus 90 is configured to carry and rotate the workpiece, which facilitates the machining of the laser apparatus 70. In this implementation, the roller apparatus 90 is disposed in machining space, and the laser apparatus 70 performs machining on the workpiece when the laser apparatus 70 moves to a position over the roller apparatus 90 through the rail apparatus 30.

Figure 23:
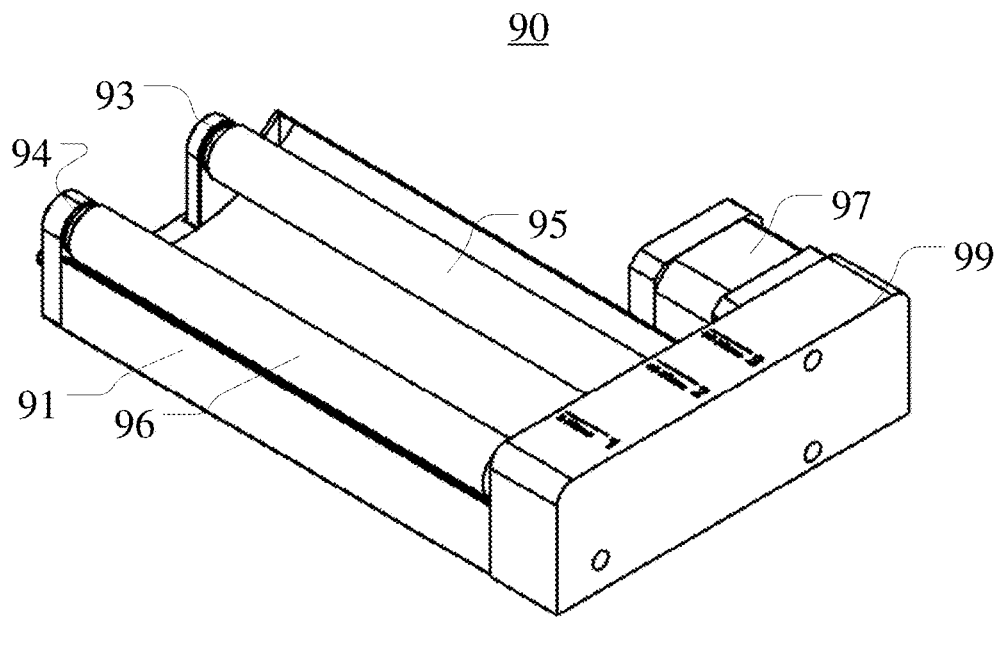
FIG. 23 is a schematic perspective assembly view of a roller apparatus.
Figure 24:
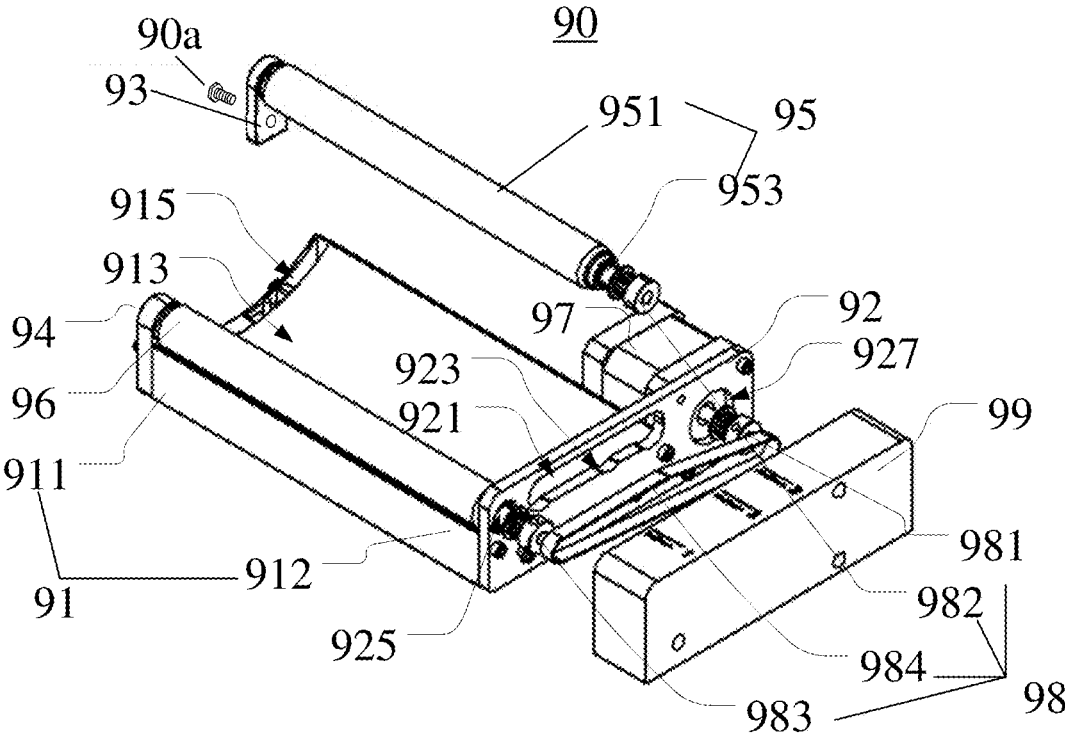
FIG. 24 is an exploded schematic perspective view of a roller apparatus illustrated in FIG. 23.

More specifically, reference can be made to FIG. 23 and FIG. 24. The roller apparatus 90 includes a stage 91, a limiting member 92, an adjustment plate 93, a fixed plate 94, a first roller 95, a second roller 96, a driving member 97, a transmission assembly 98, and a housing 99. The stage 91 is configured to carry the workpiece. The limiting member 92, the adjustment plate 93, and the fixed plate 94 each are disposed on the stage 91. The first roller 95 is rotatably connected with the limiting member 92. The first roller 95 is rotatably connected with the adjustment plate 93. The second roller 96 is rotatably connected with the limiting member 92. The second roller 96 is rotatably connected with the fixed plate 94. The driving member 97 drives the first roller 95 and the second roller 96 to rotate through the transmission assembly 98 to drive the workpiece between the first roller 95 and the second roller 96 to rotate.

The second roller 96 rotatably passes through the limiting member 92. The first roller 95 and the second roller 96 are arranged in a direction perpendicular to an axial direction of the first roller 95. The first roller 95 is able to move in an adjusting slot 921 in the direction perpendicular to the axial direction of the first roller 95, such that a distance between the first roller 95 and the second roller 96 is adjusted, thereby adapting to workpieces with different diameter specifications.

Specifically, the stage 91 has a first end 911 and a second end 912 opposite to the first end 911 in the axial direction of the first roller 95. The stage 91 further defines an arc-shaped groove 913, and the workpiece is accommodated in the arc-shaped groove 913. An arc-shaped groove 913 penetrates through an end surface of the first end 911 of the stage 91 and an end surface of the second end 912 of the stage 91. The arc-shaped groove 913 defines an adjustment groove 915 in a bottom wall of the arc-shaped groove 913 at the first end 911 of the stage 91. The adjustment groove 915 extends in the direction perpendicular to the axial direction of the first roller 95, and the adjustment plate 93 is inserted into the adjustment groove 915.

The limiting member 92 is fixed to the second end 912 of the stage 91. The limiting member 92 defines the adjusting slot 921 to be connected with the first roller 95. The adjusting slot 921 extends in the direction perpendicular to the axial direction of the first roller 95. The adjusting slot 921 defines at least two limiting recesses 923 in an inner wall of the adjusting slot 921, and that the at least two limiting recesses 923 are spaced apart from each other. The first roller 95 is accommodated in a limiting recess 923, such that a relative position between the first roller 95 and the limiting member 92 is limited. The at least two limiting recesses 923 can be adapted to at least two workpieces with different diameters.

In this implementation, a position of the limit recess 923 is adapted to a diameter specification of the workpiece. For example, the limiting recess includes a first limiting recess, a second limiting recess, and a third limiting recess, and the workpiece includes a workpiece of a first diameter, a workpiece of a second diameter, and a workpiece of a third diameter. When the first roller 95 is disposed in the first limiting recess, the workpiece of the first diameter can be placed between the first roller 95 and the second roller 96. When the first roller 95 is disposed in the second limiting recess, the workpiece of the second diameter can be placed between the first roller 95 and the second roller 96. When the first roller 95 is disposed in the third limiting recess, the workpiece of the third diameter can be placed between the first roller 95 and the second roller 96. It can be understood that the number of limit recesses 923 is not limited in the present disclosure, the number of adjustment grooves 915 is also not limited in the present disclosure, and the limit recesses 923 may be omitted. For example, a limiting column may protrude from the inner wall of the adjusting slot 921 to limit the position of the first roller 95.

The adjustment plate 93 is inserted into the adjustment groove 915 to be rotatably connected with the first roller 95. In this implementation, the roller apparatus 90 further includes a fastener 90a, and the fastener 90a detachably passes between the adjustment plate 93 and the stage 91, such that a relative position of the adjustment plate 93 and the stage 91 is limited. A position of the adjustment plate 93 in the adjustment groove 915 is adjustable. When the relative position of the adjustment plate 93 and the stage 91 needs to be adjusted, the fastener 90a is removed, such that the adjustment plate 93 is able to move in the adjustment groove 915. When the relative position of the adjustment plate 93 and the stage 91 is determined, the fastener 90a passes between the adjustment plate 93 and the stage 91 to limit the relative position of the adjustment plate 93 and the stage 91, such that a possibility of movement (including shaking) of the adjustment plate 93 relative to the stage 91 is reduced, and a possibility of shaking of the workpiece during machining is also reduced.

It can be understood that a fixed mode between the adjustment plate 93 and the stage 91 is not limited to the fastener 90a, and may be a magnet, a set screw, or the like, which is not limited in the present disclosure.

The fixed plate 94 is fixed to the first end 911 of the stage 91 to be rotatably connected with the second roller 96.

The first roller 95 includes a first shaft portion 951 and a second shaft portion 953 which are connected with each other. One end of the first shaft portion 951 away from the second shaft portion 953 is rotatably connected with the adjustment plate 93. The second shaft portion 953 passes through one of the at least two limiting recesses 923. The second shaft portion 953 is configured to be connected with the transmission assembly 98. In this implementation, the first shaft portion 951 has an outer diameter larger than the second shaft portion 953.

One end of the second roller 96 is rotatably connected with the fixed plate 94. The limiting member 92 further defines a rotating hole 925. The other end of the second roller 96 passes through the rotating hole 925 of the limiting member 92. The driving member 97 is fixed to the limiting member 92. The limiting member 92 further defines a through hole 927. The driving member 97 and the first shaft portion 951 of the first roller 95 are disposed at the same side of the limiting member 92. The driving member 97 has a driving shaft passing through the through hole 927. The driving shaft of the driving member 97 is configured to be connected with the second shaft portion 953 of the first roller 95 and the second roller 96 through the transmission assembly 98, to drive the first roller 95 and the second roller 96 to rotate. The limiting member 92 is disposed between the transmission assembly 98 and the first shaft portion 951 of the first roller 95.

The transmission assembly 98 includes a driving gear 981, a first driven gear 982, a second driven gear 983, and a synchronous belt 984. A rotation-stopping connection is formed between the driving gear 981 and the driving shaft of the driving member 97. A rotation-stopping connection is formed between the first driven gear 982 and the second shaft portion 953 of the first roller 95. The limiting member 92 is disposed between the first driven gear 982 and the first shaft portion 951 of the first roller 95. A rotation-stopping connection is formed between the second driven gear 983 and an end of the second roller 96 closed to the second end 912 of the stage 91. The synchronous belt 984 is wound around the driving gear 981, the first driven gear 982, and the second driven gear 983. In this implementation, the first driven gear 982 is fixedly sleeved on the second shaft portion 953, and the second driven gear 983 is fixedly sleeved on an end of the second roller 96 away from remote from the fixed plate 94.

When the driving shaft of the driving member 97 drives the driving gear 981 to rotate, the synchronous belt 984 drives the first driven gear 982 and the second driven gear 983 to rotate, the first driven gear 982 drives the first roller 95 to rotate, and the second driven gear 983 drives the second roller 96 to rotate, thereby driving the workpiece between the first roller 95 and the second roller 96 to rotate, which facilitates the machining of the laser apparatus 70. It can be understood that a structure of the transmission assembly 98 is not limited in the present disclosure, and the transmission assembly 98 may be omitted. For example, the first roller 95 may be driven to rotate by a single driving member 97, and the second roller 96 may be driven to rotate by a single driving member 97.

It can be understood that the driving member 97 may not be mounted on the limiting member 92, but may be directly fixed to the stage 91.

The roller apparatus 90 further includes a housing 99 connected with the limiting member 92. The housing 99 and the limiting member 92 cooperatively define an accommodating cavity. The driving gear 981, the first driven gear 982, the second driven gear 983, and the synchronous belt 984 are accommodated in the accommodating cavity. Since the transmission assembly 98 is hidden in the accommodating cavity defined by the housing 99 and the limiting member 92 and is not exposed, the dust pollution during the machining of the laser machining device 100 is effectively reduced.

When the distance between the first roller 95 and the second roller 96 needs to be adjusted, the fastener 90a is loosened, such that the first roller 95 moves in the adjusting slot 921, and the adjustment plate 93 moves in the adjustment groove 915, thereby realizing adjustment of different positions of the first roller 95. One fastener 90a can realize disassembly, loosening and fixed mounting of the first roller 95, such that a difficulty of adjusting the distance between the first roller 95 and the second roller 96 is greatly reduced, and a distance adjustment efficiency is improved. It can be understood that in an implementation, the number of adjustment grooves 915 and the number of limit recesses 923 are adapted and correspond to one another respectively.

For the roller apparatus 90 and the laser machining device 100 provided in the present disclosure, the distance between the first roller 95 and the second roller 96 can be adjusted through movement of the first roller 95 and the adjusting slot 921, such that a distance adjustment operation is simple and time-saving, which improves the distance adjustment efficiency of the roller apparatus 90 and further improves the machining efficiency of the laser machining device 100.

It can be understood that the limiting member 92 may also define the adjusting slot 921 that is in sliding fit with the second roller 96, and the stage 91 may also define the adjustment groove 915 that is in sliding fit with the second roller 96, such that a range of a size specification of the workpiece that the roller apparatus 90 can carry is further expanded.

It can be understood that the adjustment plate 93 may be omitted, and the first roller 95 may be rotatably disposed on the stage 91 directly.

It can be understood that the fixed plate 94 may be omitted, and the second roller 96 may be rotatably disposed on the stage 91 directly.

The above only discloses preferred implementations of the present disclosure, which of course do not constitute a limitation to the scope of the present disclosure. Therefore, equivalent changes made according to the claims of the present disclosure still fall within the scope of the present disclosure.

What is claimed is:

1. A laser apparatus comprising a base, a laser, and a focusing member, wherein
   the laser is disposed on the base and is configured to emit a laser light;
   the base has a first end and a second end opposite to the first end;
   the focusing member is movably disposed on the base and has a focusing end;
   the laser apparatus is operable in a retracting state and an extending state;
   when the focusing end is stacked on the base, the laser apparatus is in the retracting state;

when the focusing end extends beyond the second end of the base to abut against a workpiece, the laser apparatus is in the extending state; and the focusing member further comprises a connecting end opposite to the focusing end, the connecting end is rotatably disposed at the second end of the base, and the focusing member is configured to rotate by taking a joint of the connecting end and the base as a rotating pivot point.

2. The laser apparatus of claim 1, wherein the base defines a mounting groove for the focusing member in an outer wall of the base, the mounting groove for the focusing member penetrates through an end surface of the second end of the base, and the connecting end is rotatably connected with an inner wall of the mounting groove for the focusing member; and when the focusing end is accommodated in the mounting groove for the focusing member, the laser apparatus is in the retracting state.

3. The laser apparatus of claim 2, wherein the focusing member further comprises a plate body and a protrusion protruding from an outer wall of the plate body, the plate body comprises the connecting end and the focusing end opposite to the connecting end, and the protrusion exposes beyond the mounting groove for the focusing member.

4. The laser apparatus of claim 1, wherein the laser apparatus is connected with a rail apparatus, the rail apparatus comprises a mounting plate, and the mounting plate is configured to be movably connected with the base to adjust a relative position of the mounting plate and the base.

5. The laser apparatus of claim 4, wherein the base is provided with a first guide portion on an outer wall of the base, the mounting plate is provided with a second guide portion, the first guide portion is slidably connected with the second guide portion, one of the first guide portion and the second guide portion is a guide rail, another of the first guide portion and the second guide portion is a guide-rail groove, and the guide rail is slidably accommodated in the guide-rail groove.

6. The laser apparatus of claim 5, wherein the first guide portion is the guide rail, the second guide portion is the guide-rail groove, the mounting plate defines an adjustment hole in an outer wall of the mounting plate, the adjustment hole communicates with the guide-rail groove, the laser apparatus further comprises a locking member, the locking member passes through the adjustment hole and abuts against the guide rail, and the locking member is configured to limit the relative position of the mounting plate and the base.

7. The laser apparatus of claim 5, wherein the second guide portion is the guide rail, the first guide portion is the guide-rail groove, the base defines an adjustment hole in an outer wall of the base, the adjustment hole communicates with the guide-rail groove, the laser apparatus further comprises a locking member, the locking member passes through the adjustment hole and abuts against the guide rail, and the locking member is configured to limit the relative position of the mounting plate and the base.

8. The laser apparatus of claim 6, wherein the locking member is a threaded member, and the adjustment hole is a threaded hole.

9. The laser apparatus of claim 1, wherein the laser apparatus comprises a cooling fan, the base defines a fan mounting groove at the first end of the base, the cooling fan is accommodated in the fan mounting groove, the fan mounting groove defines a cooling ventilation duct and a first accommodating cavity at a bottom wall of the fan mounting groove, a side wall of the base defines an opening communicating with the fan mounting groove for entry of the cooling fan into the fan mounting groove or exit of the cooling fan from the fan mounting groove, the cooling ventilation duct penetrates through an end surface of the second end of the base to dissipate heat, and the laser is accommodated in the first accommodating cavity;

the laser apparatus further comprises a circuit board, the base defines a mounting cavity for the circuit board, the mounting cavity for the circuit board communicates with the cooling ventilation duct, the circuit board is accommodated in the mounting cavity for the circuit board, the circuit board is provided with a control circuit, the cooling fan is electrically connected with the control circuit of the circuit board, and the laser is electrically connected with the control circuit of the circuit board;

the laser apparatus further comprises an infrared aiming laser for emitting an infrared aiming laser light, the fan mounting groove further defines a second accommodating cavity at the bottom wall of the fan mounting groove, the second accommodating cavity penetrates through the end surface of the second end of the base, the infrared aiming laser is fixedly accommodated in the second accommodating cavity, and the infrared aiming laser is configured to emit an intersecting infrared light point as a reference point for positioning the laser;

the laser apparatus further comprises a cover plate and a carrier column, the carrier column is fixed between the cover plate and the cooling fan, the cover plate defines a vent, the cooling fan is spaced apart from the cover plate to define a communicating ventilation duct communicating with the cooling ventilation duct;

the laser apparatus further comprises a protective housing fixed to the second end of the base, the laser has an emitting end for emitting a laser light, the protective housing surrounds the emitting end of the laser; and the laser apparatus further comprises a baffle plate, the baffle plate is fixedly connected with the first end of the base, the baffle plate covers the opening, and the cooling fan is enclosed in the base.

10. A laser machining device, comprising:

a rail apparatus comprising a rail frame assembly and a mounting assembly, wherein the rail frame assembly comprises a rail frame and a guide shaft fixed to the rail frame, the mounting assembly comprises a mounting base and a pulley, the pulley defines a sliding groove, and the sliding groove is slidably connected with the guide shaft;

a laser apparatus connected with the mounting base, and configured to emit a laser light to perform laser machining on a workpiece; and a roller apparatus, wherein the roller apparatus comprises a stage, a limiting member, a first roller, and a second roller, the limiting member is fixed to the stage, the limiting member defines an adjusting slot, the first roller rotatably passes through the adjusting slot, the second roller rotatably passes through the limiting member, the first roller and the second roller are arranged in a direction perpendicular to an axial direction of the first roller, the adjusting slot extends in the direction perpendicular to the axial direction of the first roller, and the first roller is configured to move in the direction perpendicular to the axial direction of the first roller to adjust a distance between the first roller and the second roller.

11. The laser machining device of claim 10, wherein the laser apparatus comprises a base, a laser, and a focusing member; the laser is disposed on the base and is configured to emit a laser light; the base has a first end and a second end opposite to the first end; the focusing member is movably disposed on the base and has a focusing end; the laser apparatus is operable in a retracting state and an extending state; when the focusing end is stacked on the base, the laser apparatus is in the retracting state; and when the focusing end extends beyond the second end of the base to abut against the workpiece, the laser apparatus is in the extending state.

12. The laser machining device of claim 11, wherein the focusing member further comprises a connecting end opposite to the focusing end, the connecting end is rotatably disposed at the second end of the base, and the focusing member is configured to rotate by taking a joint of the connecting end and the base as a rotating pivot point; the base defines a mounting groove for the focusing member in an outer wall of the base, the mounting groove for the focusing member penetrates through an end surface of the second end of the base, and the connecting end is rotatably connected with an inner wall of the mounting groove for the focusing member; and when the focusing end is accommodated in the mounting groove for the focusing member, the laser apparatus is in the retracting state; and the focusing member further comprises a plate body and a protrusion protruding from an outer wall of the plate body, the plate body comprises the connecting end and the focusing end opposite to the connecting end, and the protrusion exposes beyond the mounting groove for the focusing member.

13. The laser machining device of claim 10, wherein the pulley is rotatably mounted on the mounting base, and configured to roll along the guide shaft.

14. The laser machining device of claim 10, wherein the guide shaft comprises a first guide shaft and a second guide shaft, the pulley comprises a first pulley and a second pulley, the first pulley is mounted on the mounting base and slidably connected with the first guide shaft, the first pulley is disposed between the first guide shaft and the second guide shaft, the second pulley is mounted on the mounting base and slidably connected with the second guide shaft, and the second pulley is disposed between the first guide shaft and the second guide shaft.

15. The laser machining device of claim 14, wherein the rail frame defines a groove, at least part of the first guide shaft is accommodated in the groove, at least part of the second guide shaft is accommodated in the groove, the first pulley is accommodated in the groove, the second pulley is accommodated in the groove, and the first guide shaft is disposed opposite to the second guide shaft; and the rail frame comprises a first connecting portion and a second connecting portion fixedly connected with the first connecting portion, the first connecting portion and the second connecting portion cooperatively define the groove; the first connecting portion defines a first accommodating groove communicating with the groove, and the first guide shaft is fixedly accommodated in the first accommodating groove; and the second connecting portion defines a second accommodating groove communicating with the groove, and the second guide shaft is fixedly accommodated in the second accommodating groove.

16. The laser machining device of claim 10, wherein the guide shaft comprises a first guide shaft and a second guide shaft, the pulley comprises a first pulley and a second pulley, the first pulley is mounted on the mounting base and slidably connected with the first guide shaft, the first guide shaft is disposed between the first pulley and the second pulley, the second pulley is mounted on the mounting base and slidably connected with the second guide shaft, and the second guide shaft is disposed between the first pulley and the second pulley.

17. The laser machining device of claim 16, wherein the rail frame comprises a first connecting portion, a second connecting portion, and a third connecting portion that are fixedly connected with one another, the third connecting portion is connected between the first connecting portion and the second connecting portion, and the first connecting portion, the second connecting portion, and the third connecting portion cooperatively define a groove;

the first guide shaft is fixed to an end of the first connecting portion connected with the third connecting portion; and the second guide shaft is fixedly accommodated in an end of the first connecting portion away from the third connecting portion, and the first connecting portion is disposed between the first pulley and the second pulley.

18. The laser machining device of claim 16, wherein the rail frame comprises a first connecting portion and a second connecting portion fixedly connected with the first connecting portion, the first connecting portion defines a groove on a surface of the first connecting portion away from the second connecting portion; the second connecting portion defines a guide groove, and the guide groove has an opening direction different from the groove; and the first guide shaft is fixed to an inner wall of the guide groove, the second guide shaft is fixed to an end surface of the first connecting portion away from the second connecting portion, the first connecting portion is disposed between the first pulley and the second pulley, and the first pulley is accommodated in the guide groove.

19. The laser machining device of claim 10, wherein the mounting base comprises a mounting plate and a connecting member fixed to the mounting plate, the pulley is mounted on the mounting plate; and the rail apparatus further comprises a driving member and a transmission assembly, the transmission assembly comprises a driving gear, a driven gear, and a synchronous belt, the driving gear is connected with the driving member, the driven gear is rotatably disposed on the rail frame, the synchronous belt is wound around the driving gear and the driven gear, the connecting member is connected with the synchronous belt, and rotation of the driving gear is configured to drive rotation of the synchronous belt to drive linear movement of the mounting assembly along the guide shaft.

20. The laser machining device of claim 10, wherein the roller apparatus further comprises an adjustment plate, the first roller is rotatably connected with the adjustment plate, the stage has a first end and a second end opposite to the first end in the axial direction of the first roller, the stage further defines an arc-shaped groove for accommodation of a workpiece, the arc-shaped groove penetrates through an end surface of the first end of the stage and an end surface of the second end of the stage, the arc-shaped groove defines an adjustment groove in a bottom wall of the arc-shaped groove at the first end of the stage, the adjustment groove extends in the direction perpendicular to the axial direction of the first roller, and the adjustment plate is inserted into the adjustment groove; and the adjusting slot defines at least two limiting recesses in an inner wall of the adjusting slot, the at least two limiting recesses are spaced apart from each other, and the at least two limiting recesses are configured to accommodate the first roller.

21. The laser machining device of claim 20, wherein the roller apparatus further comprises a fixed plate and a transmission assembly, the second roller is rotatably connected with the limiting member, the fixed plate is fixed to the first end of the stage, the first roller comprises a first shaft portion and a second shaft portion which are connected with each other, one end of the first shaft portion away from the second shaft portion is rotatably connected with the adjustment plate, the second shaft portion passes through one of the at least two limiting recesses, and the second shaft portion is configured to be connected with the transmission assembly.

22. The laser machining device of claim 21, wherein the roller apparatus further comprises a driving member, one end of the second roller is rotatably connected with the fixed plate, the limiting member further defines a rotating hole, another end of the second roller passes through the rotating hole of the limiting member, the driving member is fixed to the limiting member, the limiting member further defines a through hole, the driving member and the first shaft portion of the first roller are disposed at a same side of the limiting member, the driving member has a driving shaft rotatably passing through the through hole, the driving shaft of the driving member is configured to be connected with the second shaft portion of the first roller and the second roller through the transmission assembly to drive the first roller and the second roller to rotate, and the limiting member is disposed between the transmission assembly and the first shaft portion of the first roller; and the transmission assembly comprises a driving gear, a first driven gear, a second driven gear, and a synchronous belt, a rotation-stopping connection is formed between the driving gear and the driving shaft of the driving member, a rotation-stopping connection is formed between the first driven gear and the second shaft portion of the first roller, the limiting member is disposed between the first driven gear and the first shaft portion of the first roller, a rotation-stopping connection is formed between the second driven gear and an end of the second roller closer to the second end of the stage, and the synchronous belt is wound around the driving gear, the first driven gear, and the second driven gear.

* * * * *